US012763051B2

(12) United States Patent
Wang

(10) Patent No.: US 12,763,051 B2
(45) Date of Patent: Oct. 13, 2026

(54) VIRTUAL-MUSICAL-INSTRUMENT-BASED AUDIO PROCESSING METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Weihang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 997 days.

(21) Appl. No.: 17/991,654

(22) Filed: Nov. 21, 2022

(65) Prior Publication Data

US 2023/0090995 A1 Mar. 23, 2023

Related U.S. Application Data

(63) Continuation of application No. PCT/CN2022/092771, filed on May 13, 2022.

(30) Foreign Application Priority Data

Jun. 3, 2021 (CN) ......................... 202110618725.7

(51) Int. Cl.
*G10H 1/36* (2006.01)
*G06V 20/40* (2022.01)

(52) U.S. Cl.
CPC ............. *G10H 1/368* (2013.01); *G06V 20/46* (2022.01); *G10H 2220/106* (2013.01)

(58) Field of Classification Search
CPC ... G10H 1/368; G10H 2220/106; G06V 20/46
USPC ........................................................ 84/610
See application file for complete search history.

(56) References Cited

U.S. PATENT DOCUMENTS

2002/0162445 A1* 11/2002 Naples .................. G10H 1/365 84/610
2010/0009749 A1* 1/2010 Chrzanowski, Jr. .... A63F 13/54 463/31
2023/0090995 A1* 3/2023 Wang .................. G10H 1/0016 84/610

FOREIGN PATENT DOCUMENTS

CN 106648083 A * 5/2017 ............. G06F 3/017
CN 109462776 A * 3/2019 ............. G06T 7/246
CN 209543642 U * 10/2019
CN 111651054 A * 9/2020 ........... G06F 3/0488
CN 111679742 A * 9/2020 .............. G06F 3/011
CN 111713090 A * 9/2020 ....... H04N 21/41407
(Continued)

OTHER PUBLICATIONS

International Search Report and Written Opinion in PCT/CN2022/092771, mailed Jul. 22, 2022, 13 pages.

*Primary Examiner* — Christina M Schreiber
(74) *Attorney, Agent, or Firm* — ArentFox Schiff LLP

(57) ABSTRACT

A virtual-musical-instrument-based audio processing method is provided. In the method, a video is played. A virtual musical instrument is displayed in the video when the virtual musical instrument is matched with at least one musical instrument graphic element in the video. Played audio of the virtual musical instrument is outputted according to interactions with the at least one musical instrument graphic element matched with the virtual musical instrument in the video. Apparatus and non-transitory computer-readable storage medium counterpart embodiments are also contemplated.

20 Claims, 18 Drawing Sheets

(56) References Cited

FOREIGN PATENT DOCUMENTS

| | | | | | |
|---|---|---|---|---|---|
| CN | 112752149 | A | * | 5/2021 | ............. H04L 65/75 |
| WO | WO-0120594 | A1 | * | 3/2001 | ............. G10H 1/361 |
| WO | WO-2019161312 | A1 | * | 8/2019 | ............. G06F 3/165 |
| WO | WO-2022252966 | A1 | * | 12/2022 | ........... G06F 16/783 |

* cited by examiner

VIRTUAL-MUSICAL-INSTRUMENT-BASED AUDIO PROCESSING METHOD AND APPARATUS, ELECTRONIC DEVICE, COMPUTER-READABLE STORAGE MEDIUM, AND COMPUTER PROGRAM PRODUCT

RELATED APPLICATIONS

The present application is a continuation of International Application No. PCT/CN2022/092771, filed on May 13, 2022, which claims priority to Chinese Patent Application No. 202110618725.7, filed on Jun. 3, 2021. The entire disclosures of the prior applications are hereby incorporated by reference in their entirety.

FIELD OF THE TECHNOLOGY

This application relates to Internet technologies, including to a virtual-musical-instrument-based audio processing method and apparatus, an electronic device, a computer-readable storage medium, and a computer program product.

BACKGROUND OF THE DISCLOSURE

Video is an information carrier for efficient content dissemination. A user may edit a video through a video editing function provided by a client, for example, manually adding an audio to the video. However, the editing efficiency of this video editing mode is relatively low. Another solution is limited by an own video editing level of the user and a limited range of audios that may be synthesized. Therefore, the expressiveness of the video formed by editing is also not ideal, and editing processing needs to be repeated, resulting in relatively low human-computer interaction efficiency.

SUMMARY

Embodiments of this disclosure provide a virtual-musical-instrument-based audio processing method and apparatus, an electronic device, a non-transitory computer-readable storage medium, and a computer program product, which may implement interaction for automatically playing an audio based on a material or element similar to a virtual musical instrument in a video, enhance the expressiveness of the video, enriching human-computer interaction forms, and improve video editing efficiency and human-computer interaction efficiency.

Technical solutions of the embodiments of this disclosure include the following.

According to an aspect of the present disclosure, a virtual-musical-instrument-based audio processing method is provided. In the method, a video is played. A virtual musical instrument is displayed in the video when the virtual musical instrument is matched with at least one musical instrument graphic element in the video. Played audio of the virtual musical instrument is outputted according to interactions with the at least one musical instrument graphic element matched with the virtual musical instrument in the video. Apparatus and non-transitory computer-readable storage medium counterpart embodiments are also contemplated.

According to an aspect of the present disclosure, a virtual-musical-instrument-based audio processing apparatus is provided. The virtual-musical-instrument-based audio processing apparatus includes processing circuitry that is configured to play a video, and display a virtual musical instrument in the video when the virtual musical instrument is matched with at least one musical instrument graphic element in the video. The processing circuitry is configured to output played audio of the virtual musical instrument according to interactions with the at least one musical instrument graphic element matched with the virtual musical instrument in the video.

According to an aspect of the present disclosure, an electronic device, including a memory and a processor, is provided. The memory is configured to store executable instructions. The processor is configured to implement the virtual-musical-instrument-based audio processing method provided in embodiments of this disclosure when executing the executable instructions stored in the memory.

According to an aspect of the present disclosure, a non-transitory computer-readable storage medium is provided. The non-transitory computer-readable storage mediums stores instructions which when executed by a processor cause the processor to perform the virtual-musical-instrument-based audio processing method provided in embodiments of this disclosure.

According to an aspect of the present disclosure, a computer program product is provided. The computer program product includes a computer program or an instruction, when the computer program or the instruction is executed by a processor, implementing the virtual-musical-instrument-based audio processing method provided in embodiments of this disclosure.

Embodiment of this disclosure may include the following beneficial effects:

A musical instrument graphic material recognized from a video is endowed with an audio playing function, and a played video is outputted by conversion according to a relative movement of the musical instrument graphic material in the video, so that the expressiveness of a content of the video is enhanced in comparison with manually adding an audio to the video. In addition, the outputted played audio may be fused naturally with the content of the video, so that the experience of viewing the video is better in comparison with stiffly inserting graphic elements into the video. The played audio is outputted automatically, so that the video editing efficiency may be improved.

DESCRIPTION OF EMBODIMENTS

To make the objectives, technical solutions, and advantages of this disclosure clearer, the following describes this disclosure in further detail with reference to the accompanying drawings. The described embodiments are not to be considered as a limitation to the scope of this disclosure. Other embodiments are within the scope of this disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the comprised term "first/second" is merely intended to distinguish similar objects but does not necessarily indicate a specific order of an object. It may be understood that "first/second" is interchangeable in terms of a specific order or sequence if permitted, so that the embodiments of this disclosure described herein can be implemented in a sequence in addition to the sequence shown or described herein.

Unless otherwise defined, meanings of all technical and scientific terms used in this specification are the same as those usually understood by a person skilled in the art to which this disclosure belongs. Terms used in this specification are merely intended to describe objectives of the embodiments of this disclosure, but are not intended to limit this disclosure.

Before the embodiments of this disclosure are further described, nouns and terms involved in the embodiments of this disclosure are described. The nouns and terms provided in the embodiments of this disclosure are applicable to the following explanations.

Information flow is, for example, a data form that keeps providing contents to a user, and is actually a resource aggregator including multiple content providing sources.

Binocular ranging is, for example, a calculation method for measuring a distance between a photographing object and a camera through two cameras.

Inertial sensor is, for example an important component that mainly detects and measures accelerations, tilts, impacts, vibrations, rotations, and multi-degree-of-freedom motions to implement navigation, direction and motion carrier control.

Bow contact point is, for example, a contact point of a bow and a string, and contact points at different positions determine different pitches.

Bow pressure is, for example, pressure of a bow acting on a string, and if the pressure is higher, a volume is higher.

Bow speed is, for example, a speed of laterally pulling a bow across strings, and if the speed is higher, a tempo is higher.

Musical instrument graphic material includes, for example, a graphic material in a video or an image that may be regarded as a musical instrument or a certain playing part of the musical instrument. For example, a whisker of a cat in the video may be regarded as a string, so the whisker in the video is a musical instrument graphic material.

Figure 1A:
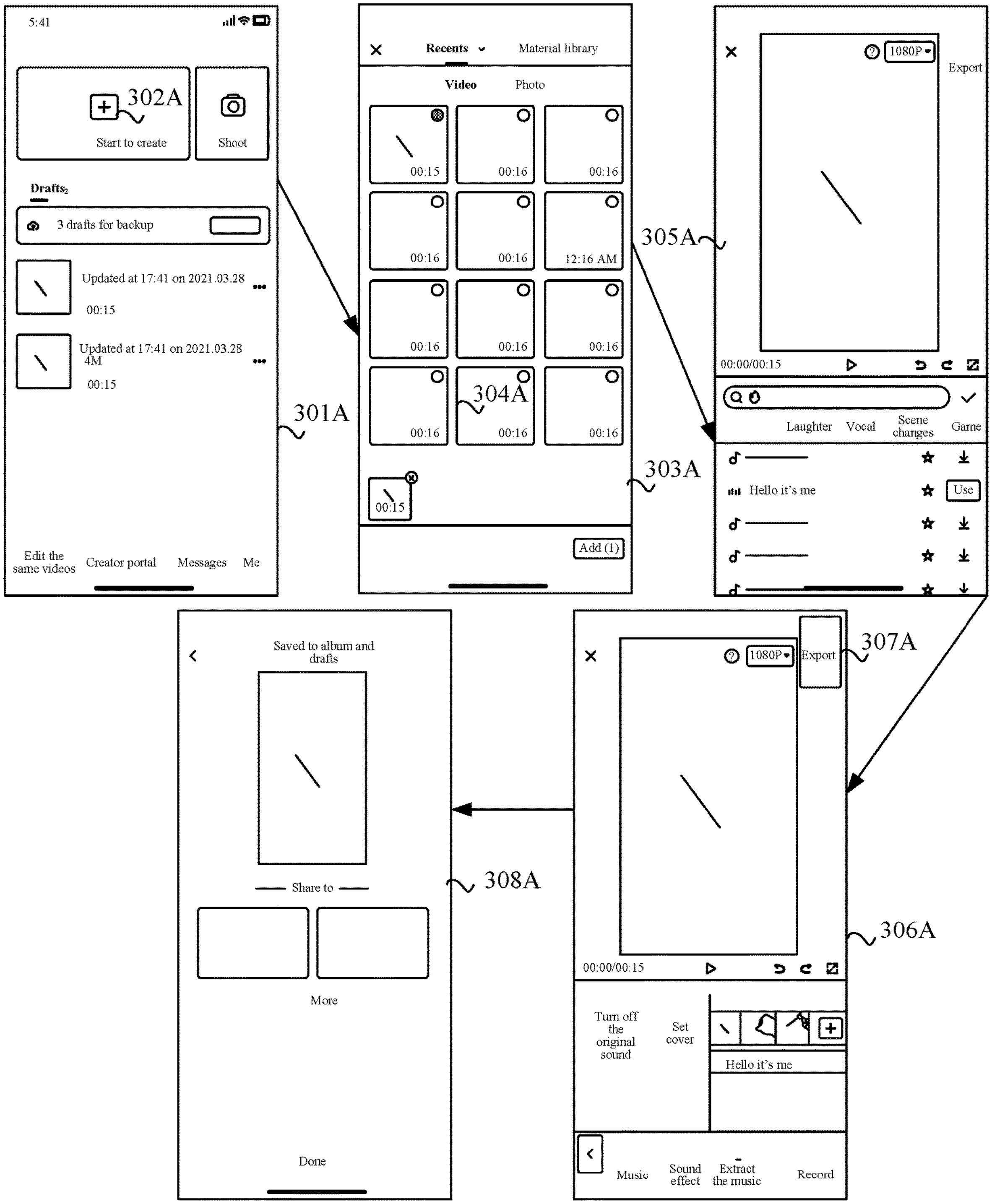
FIG. 1A (Related Art)
FIGS. 1A to 1B are schematic interface diagrams of an audio outputting product according to the related art.
Figure 1B:
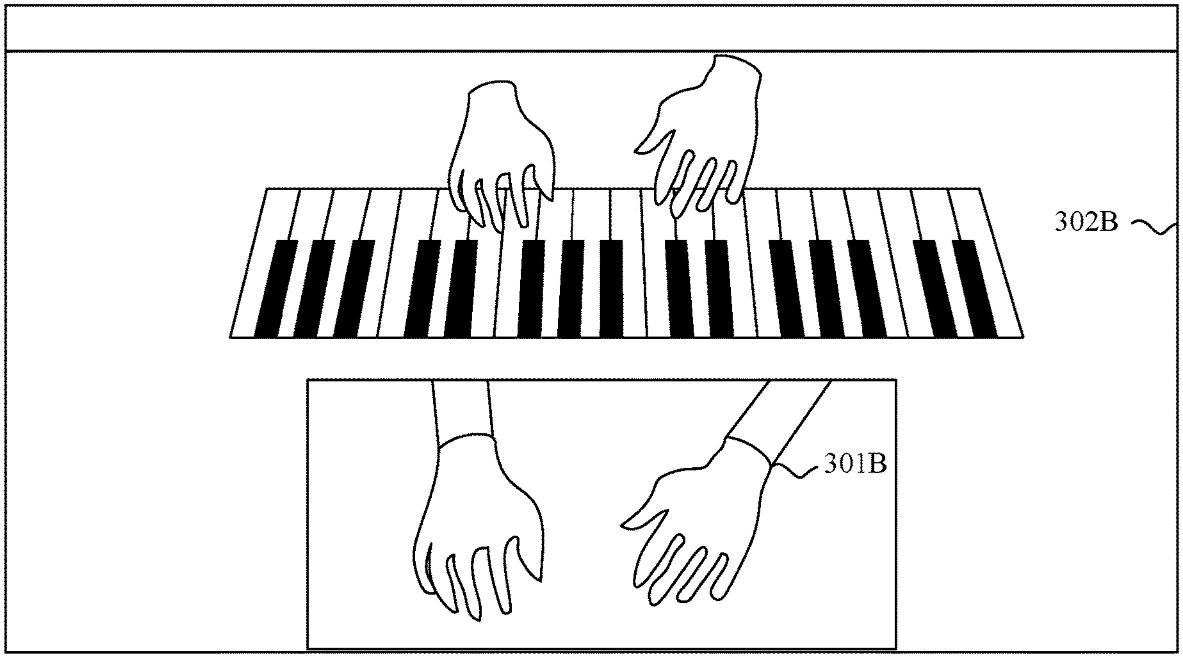
FIG. 1B (Related Art)

In the related art, there are two manners for contactless playing: post-editing and synthesis through a specific client, and gesture pressing playing through a wearable device. Referring to FIG. 1A, FIG. 1A is a schematic diagram of an interface of an audio outputting product according to the related art. The specific client may be a client of video post-editing software. In response to an operation that a user taps a start to create control 302A on a human-computer interaction interface 301A of the client, a cropping function is triggered, and a video selection page 303A is entered. Complete videos are displayed on the video selection page 303A. A background audio selection page 305A is displayed in response to a selection operation performed on a video 304A. In response to an operation that the user selects a background audio with a most consistent rhythm according to a picture of the video, the background audio is selected, an editing page 306A is entered, and beat synchronization editing processing is performed on the editing page 306A according to rhythms of the video and the background audio. In response to a triggering operation performed on an export control 307A, a new video whose background audio and video are consistent in rhythm is synthesized and exported, and a sharing page 308A is entered. Referring to FIG. 1B, FIG. 1B is a schematic interface diagram of an audio outputting product according to the related art. Gesture pressing playing is performed through a wearable device. A wearable band 301B is a hardware band for inputting a gesture to be detected for recognition. Inertial sensors are embedded into both sides of the band. Tapping actions of fingers of a user may be recognized by the inertial sensors to analyze unique vibrations of a human skeleton system. When the user plays on a desktop, a picture that the user plays a keyboard may be displayed on a human-computer interaction interface 302B. Therefore, interaction between the user and a virtual object is implemented.

The related art has the following disadvantages. First, for the solution shown in FIG. 1A, contactless playing may not be implemented in real time, no playing feedback may be given according to a current pressing behavior of the user, only post-editing and synthesis are performed, and post-editing needs to be implemented manually, bringing relatively high cost. Second, for the solution shown in FIG. 1B, contactless playing may not be performed conveniently and instantly. The technology needs to be implemented based on a wearable device, and may not implement contactless playing without any wearable device, so the implementation cost is high. The technology needs to be implemented based on a wearable device, and the user needs an additional cost to obtain the device.

Embodiments of this disclosure provide a virtual-musical-instrument-based audio processing method and apparatus, an electronic device, a computer-readable storage medium, and a computer program product. Audio generation manners may be enriched to improve user experience. In addition, an audio in strong correlation with a video is outputted automatically, so that video editing efficiency and human-computer interaction efficiency may be improved. An exemplary application of the electronic device provided in the embodiments of this disclosure will be described below. The electronic device provided in the embodiments of this disclosure may be implemented as various types of user terminals, such as a notebook computer, a tablet computer, a desktop computer, a set-top box, and a mobile device (such as a mobile phone, a portable music player, a personal digital assistant, a dedicated messaging device, and a portable game device). An exemplary application of the electronic device implemented as a terminal will be described below in combination with FIG. 2.

Figure 2:
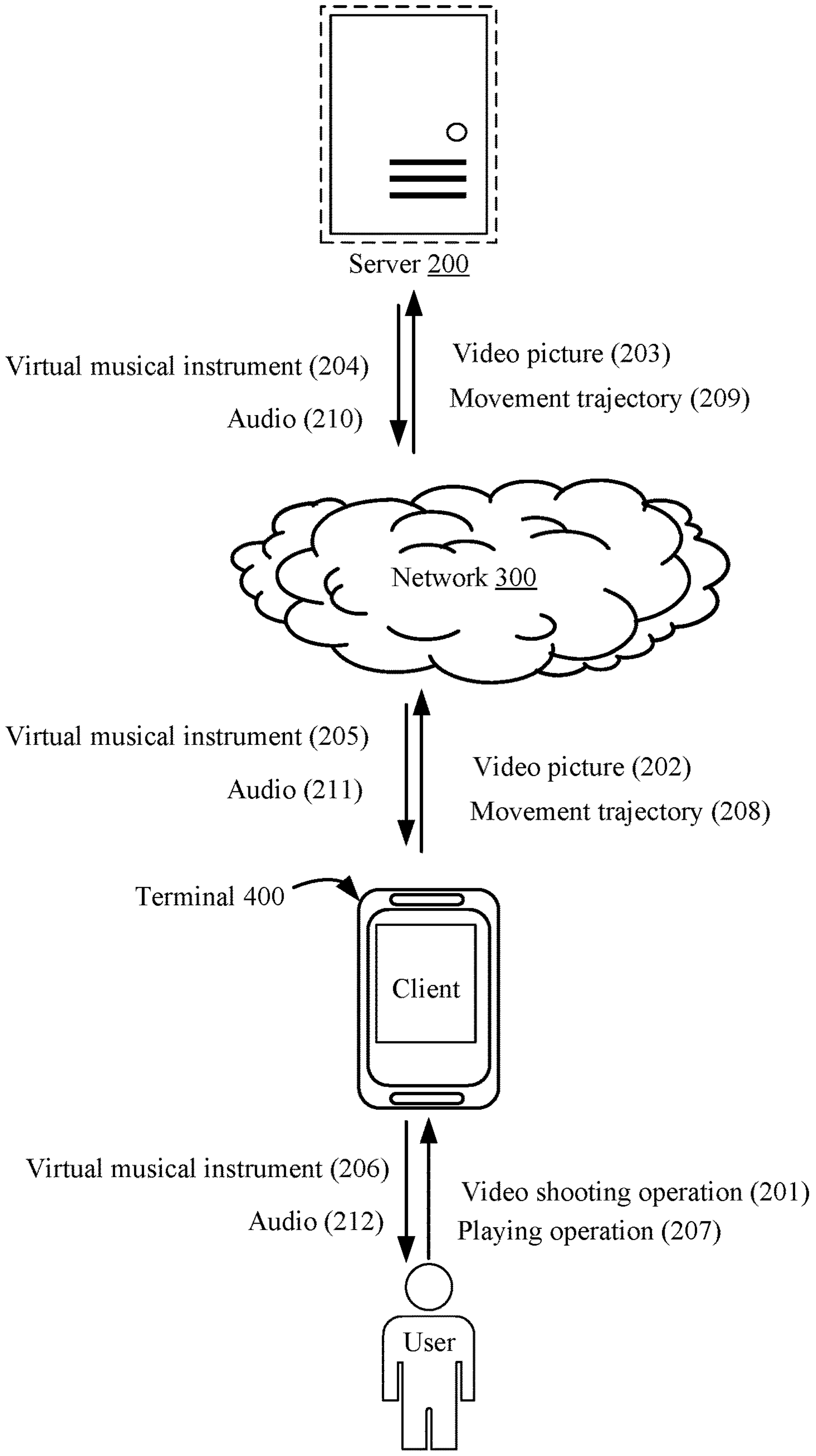
FIG. 2 is a schematic structural diagram of a virtual-musical-instrument-based audio processing system according to an embodiment of this disclosure.

Referring to FIG. 2, FIG. 2 is a schematic structural diagram of a virtual-musical-instrument-based audio processing system according to an embodiment of this disclosure. A terminal 400 is connected with a server 200 through a network 300. The network 300 may be a wide area network, a local area network, or a combination thereof.

In some embodiments, in a scene of editing a video shot in real time, in response to the terminal 400 receiving a video shooting operation (e.g., video shooting operation 201), a video is shot in real time, and the video shot in real time is played at the same time. Image recognition is performed on each image frame in the video by the terminal 400 or the server 200 (e.g., video picture 202 or video picture 203 transmitted therebetween). When a musical instrument graphic material similar in shape to a virtual musical instrument is recognized, the virtual musical instrument is displayed (e.g., virtual musical instrument 206, based on information of virtual musical instrument 204 or virtual musical instrument 205 between server 200 or terminal 400) in the video played by the terminal. During playing of the video, the musical instrument graphic material presents a relative movement trajectory (e.g., video shooting operation 208 or video shooting operation 209 based on playing operation 207). An audio corresponding to the relative movement trajectory (e.g., audio 210 or audio 211) is calculated by the terminal 400 or the server 200. The audio is outputted by the terminal 400 (e.g., audio 212).

In some embodiments, in a scene of editing a historical video, in response to the terminal 400 receiving an editing operation performed on a pre-recorded video, the pre-recorded video is played. Image recognition is performed on each image frame in the video by the terminal 400 or the server 200. When a musical instrument graphic material similar in shape to a virtual musical instrument is recognized, the virtual musical instrument is displayed in the video played by the terminal. During playing of the video, the musical instrument graphic material in the video presents a relative movement trajectory. An audio corresponding to the relative movement trajectory is calculated by the terminal 400 or the server 200. The audio is outputted by the terminal 400.

In some embodiments, the above-mentioned image recognition process and audio calculation process need to consume certain computing resources. Therefore, data to be processed may be processed locally by the terminal 400, or transmitted to the server 200, and then the server 200 performs corresponding processing and transmits a processing result back to the terminal 400.

In some embodiments, the terminal 400 may run a computer program to a method for human-computer interaction integrating multiple scenes in the embodiments of this disclosure. For example, the computer program may be a native program or software module in an operating system, or the above-mentioned client. The client may be a native application (APP), i.e., a program that needs to be installed in the operating system to run, such as a video sharing APP. Alternatively, the client may be an applet, i.e., a program that only needs to be downloaded to a browser environment to run. In general, the computer program may be any form of application, module, or plug-in.

The embodiments of this disclosure may be implemented through cloud technology, and the cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support. A background service of a technical network system requires a large amount of computing and storage resources.

In an example, the server 200 may be an independent physical server, or may be a server cluster comprising a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 may be a smartphone, a tablet computer, a notebook computer, a desktop computer, a smart speaker, a smartwatch, or the like, but is not limited thereto. The terminal 400 and the server 200 may be directly or indirectly connected in a wired or wireless communication manner. This is not limited in this embodiment of this disclosure.

Figure 3:
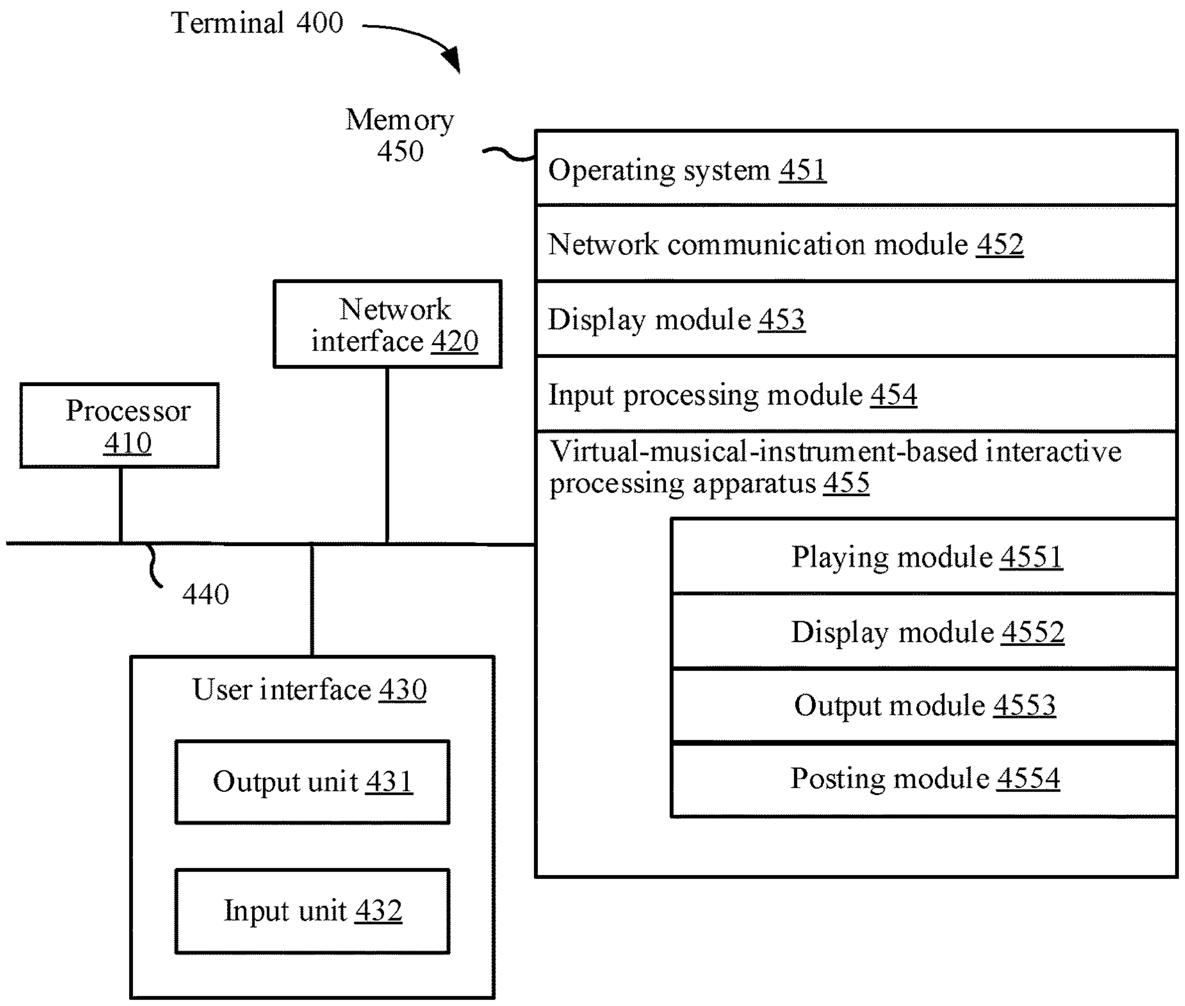
FIG. 3 is a schematic structural diagram of an electronic device according to an embodiment of this disclosure.

Referring to FIG. 3, FIG. 3 is a schematic structural diagram of an electronic device according to an embodiment of this disclosure. The terminal 400 shown in FIG. 3 includes: at least one processor 410, a memory 450, at least one network interface 420, and a user interface 430. All the components in the terminal 400 are coupled together by a bus system 440. It may be understood that, the bus system 440 is configured to implement connection and communication between the components. In addition to a data bus, the bus system 440 further includes a power bus, a control bus, and a state signal bus. However, for ease of clear description, all types of buses are marked as the bus system 440 in FIG. 3.

Processing circuitry, such as the processor 410, may include an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any processor, or the like.

The user interface 430 includes one or more output apparatuses 431 that can display media content, comprising one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 may include one or more storage devices away from the processor 410 in a physical position.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this disclosure is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, WiFi, Universal Serial Bus (USB), etc.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the virtual-musical-instrument-based audio processing apparatus provided in the embodiments of this disclosure may be implemented by software. FIG. 3 shows a virtual-musical-instrument-based audio processing apparatus 455 stored in the memory 450, which may be software in form of a program, a plug-in, etc., including the following software modules: a playing module 4551, a display module 4552, an output module 4553, and a posting module 4554. These modules are logical, and thus may be combined or further split arbitrarily according to functions to be realized. One or more modules, submodules, and/or units of the apparatus can be implemented by processing circuitry, software, or a combination thereof, for example. The following describes exemplary functions of the modules.

The virtual-musical-instrument-based audio processing method provided in the embodiments of this disclosure will be described below taking execution by the terminal 400 in FIG. 3 as an example.

Figure 4A:
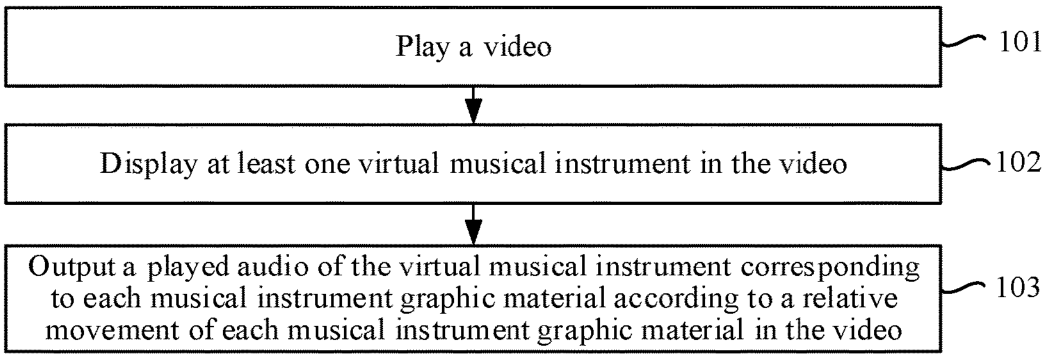
FIGS. 4A to 4C are schematic flowcharts of a virtual-musical-instrument-based audio processing method according to an embodiment of this disclosure.

Referring to FIG. 4A, FIG. 4A is a schematic flowchart of a virtual-musical-instrument-based audio processing method according to an embodiment of this disclosure. Descriptions will be made in combination with steps 101 to 103 shown in FIG. 4A. Steps 101-103 may be applied to an electronic device.

In step 101, a video is played.

As an example, the video may be a video shot in real time or a pre-recorded historical video. The video shot in real time is played while being shot.

In step 102, at least one virtual musical instrument is displayed in the video. In an example, a virtual musical instrument is displayed in the video when the virtual musical instrument is matched with at least one musical instrument graphic element in the video.

Figure 5A:
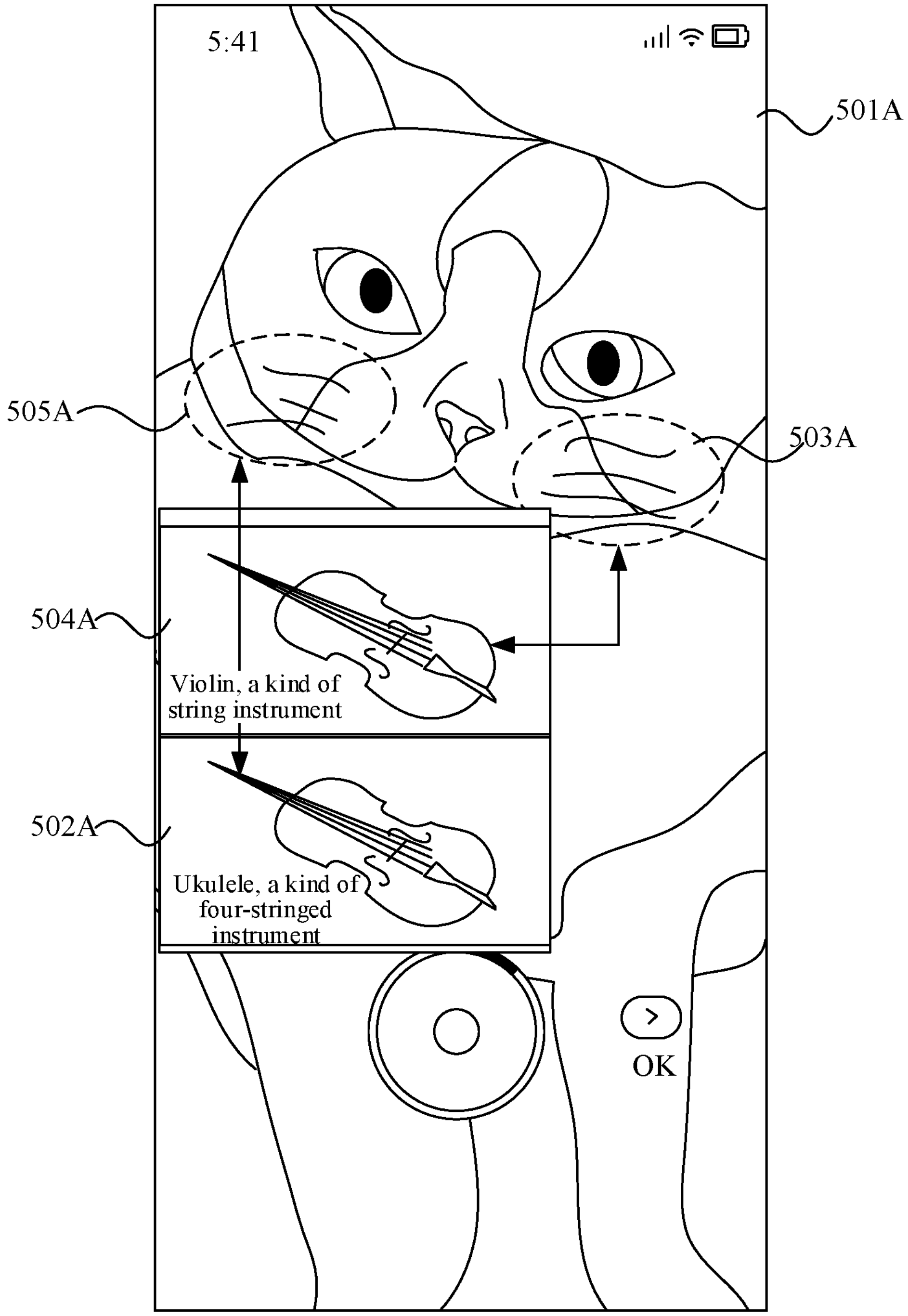
FIGS. 5A to 5I are schematic product interface diagrams of a virtual-musical-instrument-based audio processing method according to an embodiment of this disclosure.
Figure 5B:
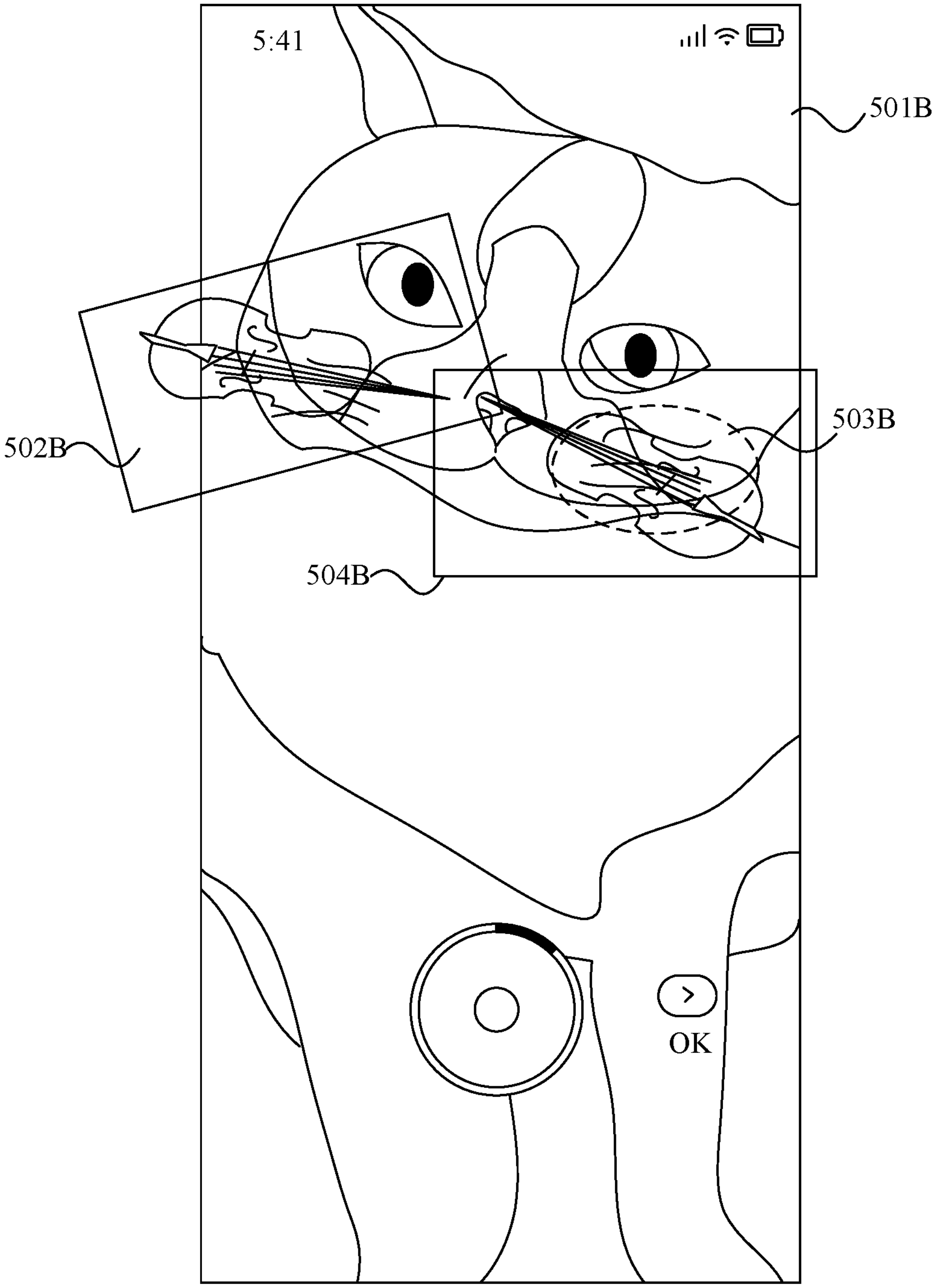

As an example, referring to FIG. 5B, FIG. 5B is a schematic product interface diagram of a virtual-musical-instrument-based audio processing method according to an embodiment of this disclosure. A video is played on a human-computer interaction interface 501B, and one virtual musical instrument 502B and another virtual musical instrument 504B are displayed in the video. The virtual musical instrument in the video may be a musical instrument pattern, such as a pattern of a ukulele or a pattern of a violin. Each virtual musical instrument is matched with a shape of at least one musical instrument graphic material recognized from the video. Being matched in shape represents that the virtual musical instrument is similar to or the same as the musical instrument graphic material in shape. Being similar in shape may be reflected in many aspects, for example: contours are the same, or key parts are the same. Specifically, a string of the virtual musical instrument is similar in shape to a whisker in the video that is regarded as a musical instrument graphic material, and a piano keyboard of the virtual musical instrument is similar in shape to a color bar in the video that is regarded as a musical instrument graphic material. Being similar in shape represents that an image similarity between the virtual musical instrument and the musical instrument graphic material is greater than a similarity threshold. The image similarity may be calculated by an image comparison method in the field of image processing or an image processing model in the field of artificial intelligence. The number of virtual musical instruments is one or more, and the number of corresponding recognized musical instrument graphic materials may also be one or more.

In some embodiments, multiple virtual musical instruments may be displayed in the video. In a case that there are in the video multiple musical instrument graphic materials in one-to-one correspondence to multiple candidate virtual musical instruments, before the operation in step 102 of displaying at least one virtual musical instrument in the video, images and introduction information of the multiple candidate virtual musical instruments are displayed, and at least one selected candidate virtual musical instrument is determined as a virtual musical instrument to be displayed in the video in response to a selection operation performed on the multiple candidate virtual musical instruments. Each musical instrument graphic material may be matched with a corresponding virtual musical instrument in response to the selection operation, so that the human-computer interaction function may be enhanced, and the diversity of human-computer interaction and the video editing efficiency may be improved.

As an example, referring to FIG. 5A, FIG. 5A is a schematic product interface diagram of a virtual-musical-instrument-based audio processing method according to an embodiment of this disclosure. A cat is displayed on a human-computer interaction interface 501A, whiskers on both sides of the cat are musical instrument graphic materials, the left whiskers of the cat are recognized as a candidate virtual musical instrument ukulele 502A, and the right whiskers 503A of the cat are recognized as a candidate virtual musical instrument violin 504A. Here, the left whiskers 505A of the cat are similar in shape to the candidate virtual musical instrument ukulele 502A, and the right whiskers of the cat are similar in shape to the candidate virtual musical instrument violin 504A. An image and introduction information of the candidate virtual musical instrument violin 504A and an image and introduction information of the candidate virtual musical instrument ukulele 502A are displayed on the human-computer interaction interface 501A. The candidate virtual musical instrument violin 504A is determined as a virtual musical instrument displayed in step 102 in response to a selection operation of a user or test software pointing to the candidate virtual musical instrument violin 504A. In addition to the scene shown in FIG. 5A, after multiple candidate virtual musical instruments are displayed, in response to a selection operation pointing to the multiple candidate virtual musical instruments, the multiple candidate virtual musical instruments that the selection operation points to may be used as virtual musical instruments displayed in step 102. The candidate virtual musical instrument corresponding to each musical instrument graphic material in FIG. 5A may be a candidate virtual musical instrument with a maximum recognition similarity with each musical instrument graphic material.

In some embodiments, in a case that there is at least one musical instrument graphic material in the video and each musical instrument graphic material corresponds to multiple candidate virtual musical instruments, before the at least one virtual musical instrument is displayed in the video, the following processing is performed for each musical instrument graphic material: images and introduction information of the multiple candidate virtual musical instruments corresponding to the musical instrument graphic material are displayed; and at least one selected candidate virtual musical instrument is determined as a virtual musical instrument to be displayed in the video in response to a selection operation performed on the multiple candidate virtual musical instruments. Each musical instrument graphic material may be matched with a corresponding virtual musical instrument in response to the selection operation, so that the human-computer interaction function may be enhanced, and the diversity of human-computer interaction and the video editing efficiency may be improved.

Figure 5C:
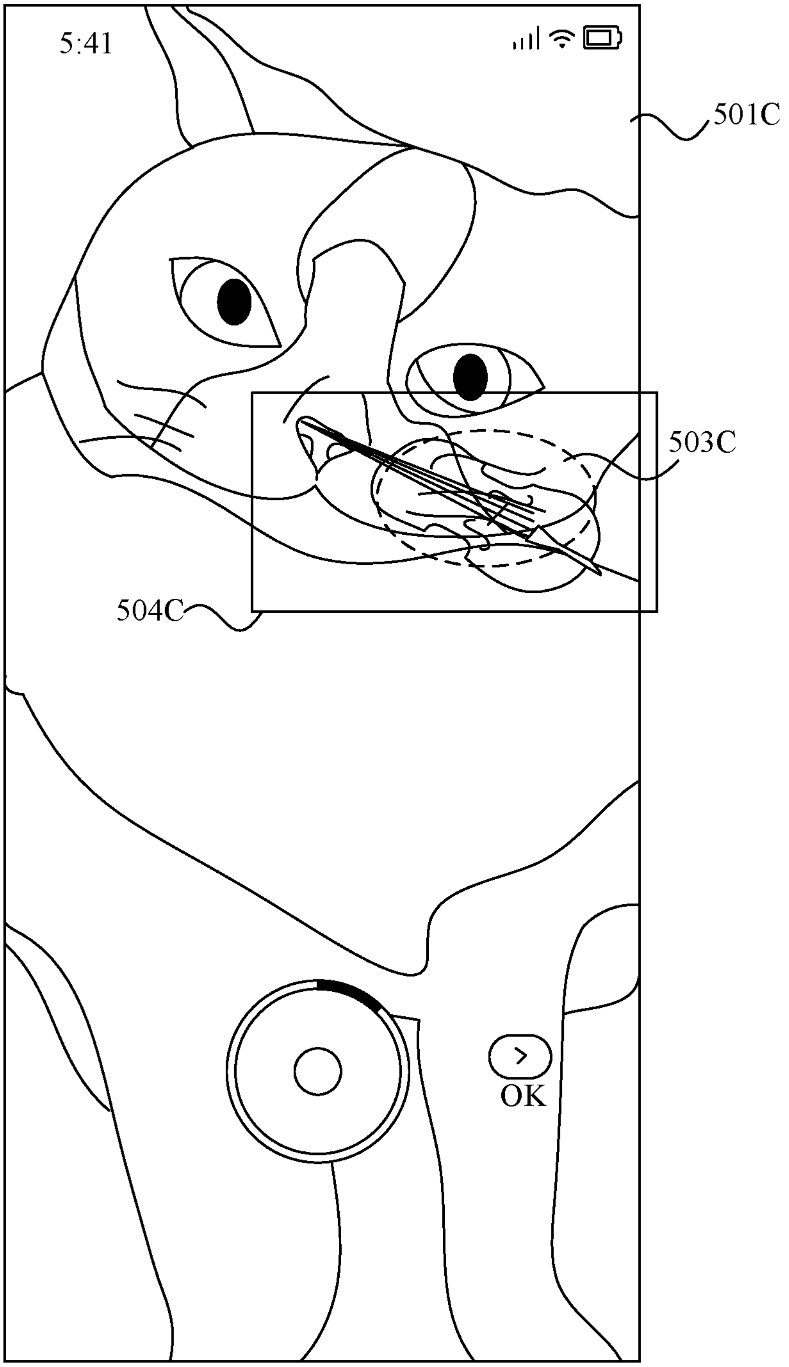
Figure 5D:
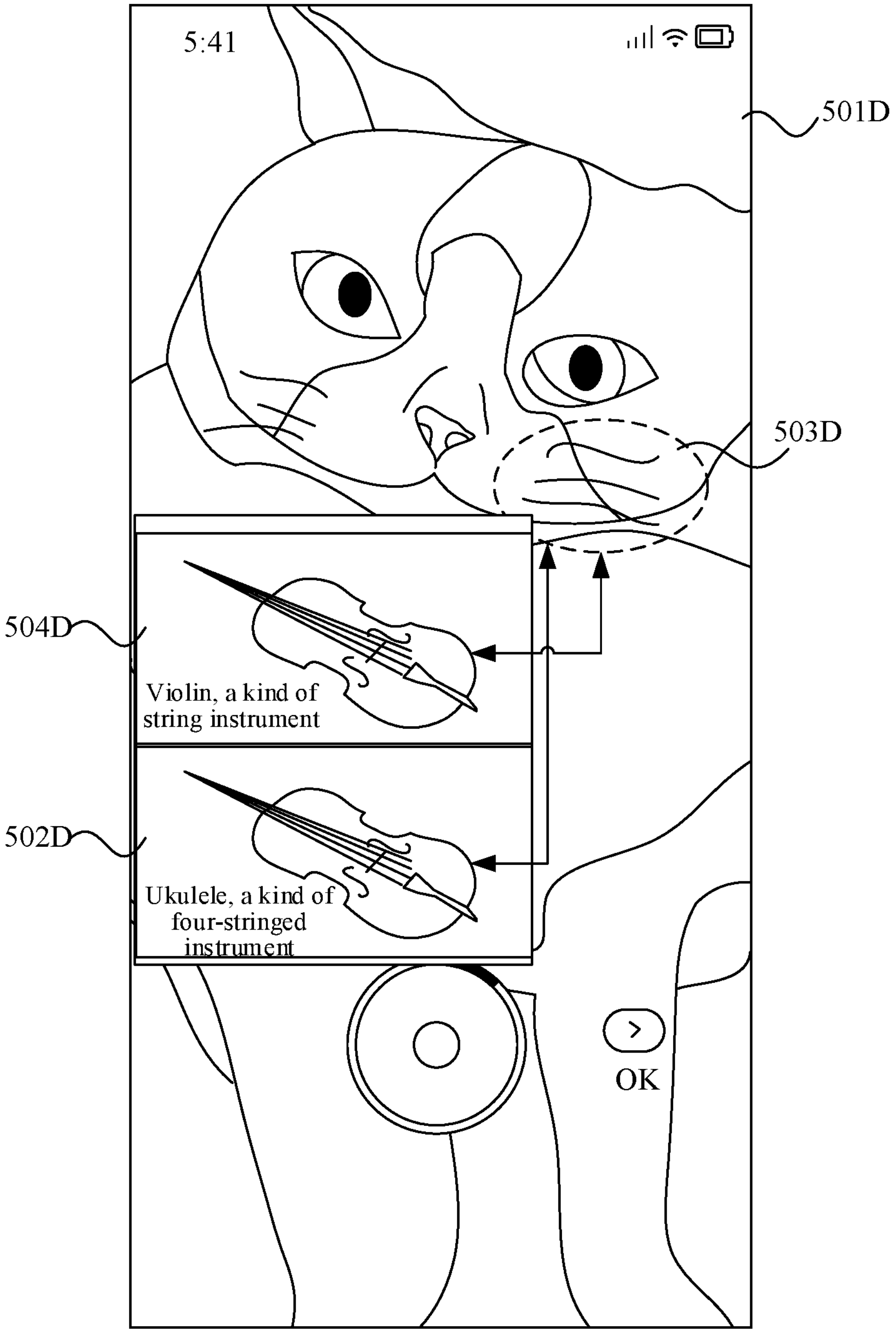

As an example, referring to FIG. 5D, FIG. 5D is a schematic product interface diagram of a virtual-musical-instrument-based audio processing method according to an embodiment of this disclosure. A cat is displayed on a human-computer interaction interface 501D, whiskers on both sides of the cat are musical instrument graphic materials, and the right whiskers 503D of the cat are recognized as a candidate virtual musical instrument violin 504D and a candidate virtual musical instrument ukulele 502D. Here, the right whiskers of the cat are similar in shape to the candidate virtual musical instrument violin 504D and the candidate virtual musical instrument ukulele 502D. An image and introduction information of the candidate virtual musical instrument violin 504D and an image and introduction information of the candidate virtual musical instrument ukulele 502D are displayed on the human-computer interaction interface 501D. The candidate virtual musical instrument violin 504D is determined as a virtual musical instrument displayed in step 102 in response to a selection operation of a user or test software pointing to the candidate virtual musical instrument violin 504D. In addition to the scene shown in FIG. 5D, after multiple candidate virtual musical instruments are displayed, in response to a selection operation pointing to the multiple candidate virtual musical instruments, the multiple candidate virtual musical instruments that the selection operation points to may be used as virtual musical instruments displayed in step 102. The multiple candidate virtual musical instruments corresponding to the musical instrument graphic materials in FIG. 5D may be candidate virtual musical instruments with top-ranked recognition similarities.

As an example, referring to FIG. 5B, FIG. 5B is a schematic product interface diagram of a virtual-musical-instrument-based audio processing method according to an embodiment of this disclosure. When a ukulele and a violin are selected as candidate virtual musical instruments (namely multiple virtual musical instruments are displayed in step 102), a cat is displayed on a human-computer interaction interface 501B, whiskers on both sides of the cat are musical instrument graphic materials, a virtual musical instrument corresponding to the left whiskers of the cat is a ukulele 502B, and a virtual musical instrument corresponding to the right whiskers 503B of the cat is a violin 504B. Here, the left whiskers of the cat are similar in shape to the ukulele 502B, for example: the number of the left whiskers of the cat is the same as that of strings of the ukulele. The right whiskers of the cat are similar in shape to the violin 504B, for example: the number of the right whiskers of the cat is the same as that of strings of the violin. In addition to determining the candidate virtual musical instruments that the selection operation points to as virtual musical instruments displayed in step 102, all recognized candidate virtual musical instruments may be displayed by default as virtual musical instruments in step 102.

As an example, referring to FIG. 5C, FIG. 5C is a schematic product interface diagram of a virtual-musical-instrument-based audio processing method according to an embodiment of this disclosure. When only a violin is selected as a candidate virtual musical instrument (namely one virtual musical instrument is displayed in step 102), a cat is displayed on a human-computer interaction interface 501C, whiskers on both sides of the cat are musical instrument graphic materials, and only a virtual musical instrument violin 504C corresponding to the right whiskers 503C of the cat is displayed. Here, the right whiskers of the cat being similar in shape to the violin 504C.

In some embodiments, before the operation in step 102 of displaying at least one virtual musical instrument in the video, multiple candidate virtual musical instruments are displayed in a case that no musical instrument graphic material corresponding to the virtual musical instrument is recognized from the video; and a selected candidate virtual musical instrument is determined as a virtual musical instrument to be displayed in the video in response to a selection operation performed on the multiple candidate virtual musical instruments. Through this embodiment of this disclosure, a video image range of outputting the played audio is expanded, and even if no music material graphs are recognized from the video and images, the virtual musical instrument may be displayed and the played audio may be outputted. Therefore, the video editing application range is expanded.

In step 103, a played audio of the virtual musical instrument corresponding to each musical instrument graphic material is output according to a relative movement of each musical instrument graphic material in the video. In an example, played audio of the virtual musical instrument is output according to interactions with the at least one musical instrument graphic element matched with the virtual musical instrument in the video.

As an example, the relative movement of the musical instrument graphic material in the video may be a relative movement of the musical instrument graphic material relative to a player or another musical instrument graphic material. For example, when a violin is played to output a played audio, a string and bow of the violin are components of a virtual musical instrument corresponding to different musical instrument graphic materials respectively, and the played audio is outputted according to a relative movement between the string and the bow. For example, when a flute is played to output a played audio, the flute is a virtual musical instrument, a finger is a player, the flute corresponds to a musical instrument graphic material, and the played audio is outputted according to a relative movement between the flute and the finger. The relative movement of the musical instrument graphic material in the video may be a relative movement of the musical instrument graphic material relative to a background. For example, when a piano is played to output a played audio, keys of the piano are components of a virtual musical instrument corresponding to different musical instrument graphic materials respectively. For example, the keys float up and down to output the corresponding played audio, and up-and-down floats of the keys are relative movements relative to the background.

As an example, when the number of musical instrument graphic materials corresponding to the virtual musical instrument is one, the played audio is a played audio obtained by a solo, such as a played audio outputted by playing a piano. When the number of musical instrument graphic materials corresponding to the virtual musical instrument is multiple, and the multiple musical instrument graphic materials are in one-to-one correspondence to multiple components of a certain virtual musical instrument, the played audio is, for example, a played audio outputted by playing a violin, where a string and a bow of the violin are components of the virtual musical instrument. When the number of musical instrument graphic materials corresponding to the virtual musical instrument is multiple, and the multiple musical instrument graphic materials correspond to multiple virtual musical instruments, the played audio is a played audio obtained by playing multiple virtual musical instruments, such as a played audio in form of symphony.

In some embodiments, the operation in step 102 of displaying at least one virtual musical instrument in the video may be implemented by the following technical solution: performing the following processing for each image frame in the video: displaying, in an overlaying manner at a position of at least one musical instrument graphic material in the image frame, a virtual musical instrument matched with a shape of the at least one musical instrument graphic material, a contour of the musical instrument graphic material being aligned with that of the virtual musical instrument. The shape-matched virtual musical instrument is displayed in the overlaying manner, so that a correlation between the musical instrument graphic material and the virtual musical instrument may be improved to further automatically correlate the played audio with the musical instrument graphic material and more effectively improve the video editing efficiency.

As an example, referring to FIG. 5C, a cat is displayed on a human-computer interaction interface 501C, whiskers on both sides of the cat are musical instrument graphic materials, and only a virtual musical instrument violin 504C corresponding to the right whiskers 503C of the cat is displayed. Here, the right whiskers of the cat are similar in shape to the violin 504C. As shown in FIG. 5C, the violin 504C similar in shape to the whiskers 503C is displayed in an overlaying manner on the human-computer interaction interface 501C, and a contour of the violin 504C is aligned with that of the whiskers 503C.

In some embodiments, when the virtual musical instrument includes multiple components, and the video includes multiple musical instrument graphic materials in one-to-one correspondence to the multiple components, the operation of displaying, in an overlaying manner at a position of at least one musical instrument graphic material in the image frame, a virtual musical instrument similar in shape to the at least one musical instrument graphic material may be implemented by the following technical solution: performing the following processing for each virtual musical instrument: displaying, in the image frame, the multiple components of the virtual musical instrument in the overlaying manner, a contour of each component overlapping that of the corresponding musical instrument graphic material. In this component-based display manner, the display flexibility of the virtual musical instrument may be improved, so that the virtual musical instrument is matched better with the musical instrument graphic material, facilitating achievement of a video editing effect satisfying the user. Therefore, the video editing efficiency may be improved.

Figure 5E:
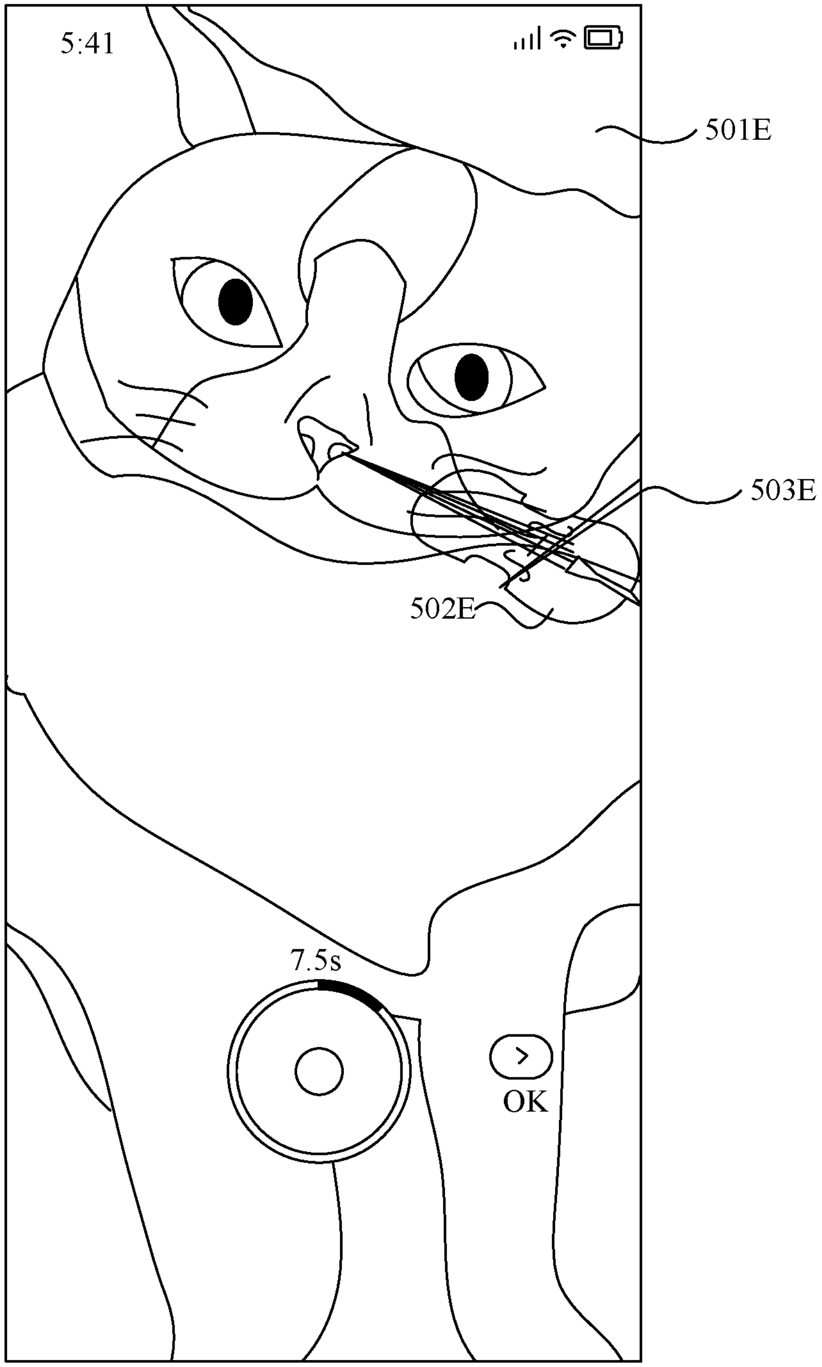

As an example, referring to FIG. 5E, FIG. 5E is a schematic product interface diagram of a virtual-musical-instrument-based audio processing method according to an embodiment of this disclosure. The violin 504C in FIG. 5C is illustrated as a virtual musical instrument, while in FIG. 5E, a string 502E is a component of a virtual musical instrument. As shown in FIG. 5E, the string 502E of a violin and a bow 503E of the violin are displayed on a human-computer interaction interface 501E. As shown in FIG. 5E, the string 502E of the violin similar in shape to a whisker is displayed in an overlaying manner on the human-computer interaction interface 501E, a contour of the string 502E of the violin being aligned with that of the whisker. The bow 503E of the violin similar in shape to a toothpick is displayed in the overlaying manner on the human-computer interaction interface 501E, a contour of the bow 503E of the violin being aligned with that of the toothpick.

As an example, a type of the virtual musical instrument includes a wind musical instrument, a bowed string musical instrument, a plucked string musical instrument, and a percussion musical instrument. The correspondence between the musical instrument graphic material and the virtual musical instrument will be described below taking these types as examples respectively. For the bowed string musical instrument, the bowed string musical instrument includes a sound box component and a bow component. For the percussion musical instrument, the percussion musical instrument includes a percussion component and a percussed component. For example, drum skin is a percussed component, and a drumstick is a percussion component. For the plucked string musical instrument, the plucked string musical instrument includes a plucking component and a plucked component. For example, a string of a Chinese zither is a plucked component, and a pick is a plucking component.

In some embodiments, the operation in step 102 of displaying at least one virtual musical instrument in the video may be implemented by the following technical solution: performing the following processing for each image frame in the video: displaying, in a region outside the image frame in a case that the image frame includes at least one musical instrument graphic material, a virtual musical instrument matched with a shape of the at least one musical instrument graphic material, and displaying a correlation identifier of the virtual musical instrument and the musical instrument graphic material, the correlation identifier including at least one of a connecting line and a text prompt. The correlation identifier is displayed, so that the played audio may be automatically correlated with the musical instrument graphic material, effectively improving the video editing efficiency.

Figure 5F:
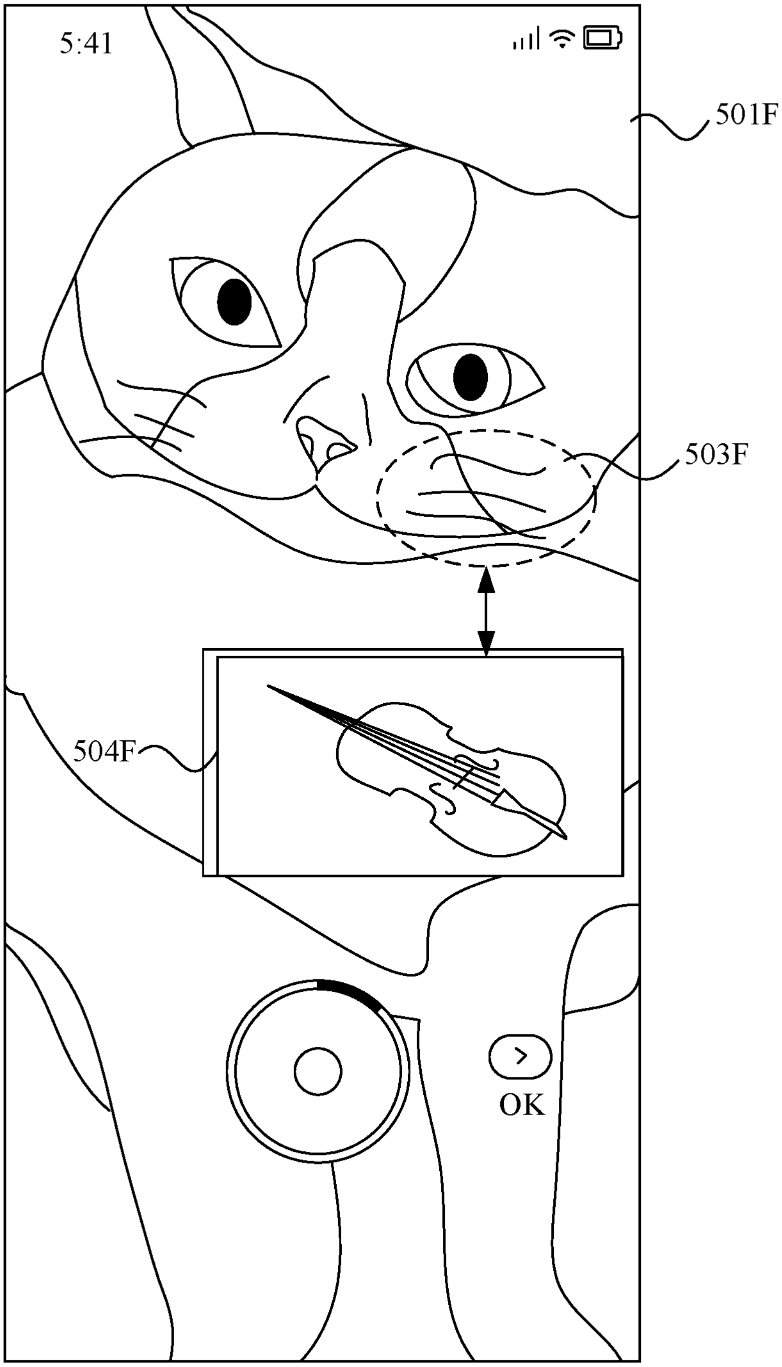

As an example, referring to FIG. 5F, FIG. 5F is a schematic product interface diagram of a virtual-musical-instrument-based audio processing method according to an embodiment of this disclosure. A cat is displayed on a human-computer interaction interface 501F, whiskers on both sides of the cat are musical instrument graphic materials, and only a virtual musical instrument violin 504F corresponding to the right whiskers 503F of the cat is displayed. Here, the right whiskers of the cat are similar in shape to the violin 504F. As shown in FIG. 5F, the violin 504F similar in shape to the whiskers 503F and a correlation identifier of the violin 504F and the whiskers 503F are displayed in a region outside an image frame. The correlation identifier in FIG. 5F is a connecting line of the whiskers 503F and the violin 504F.

In some embodiments, when the virtual musical instrument includes multiple components, and the video includes multiple musical instrument graphic materials in one-to-one correspondence to the multiple components, the operation of displaying, in a region outside the image frame, a virtual musical instrument matched with a shape of the at least one musical instrument graphic material may be implemented by the following technical solution: performing the following processing for each virtual musical instrument: displaying, in the region outside the image frame, the multiple components of the virtual musical instrument, each component being matched with the shape of the musical instrument graphic material in the image frame, a positional relationship between the multiple components being consistent with that of the corresponding musical instrument graphic material in the image frame, and being similar in shape including being consistent in size or being inconsistent in size. The positional relationship between the components is controlled to be consistent with that of the musical instrument graphic materials, so that the played audio may be automatically correlated with the musical instrument graphic material, more effectively improving the video editing efficiency.

Figure 5G:
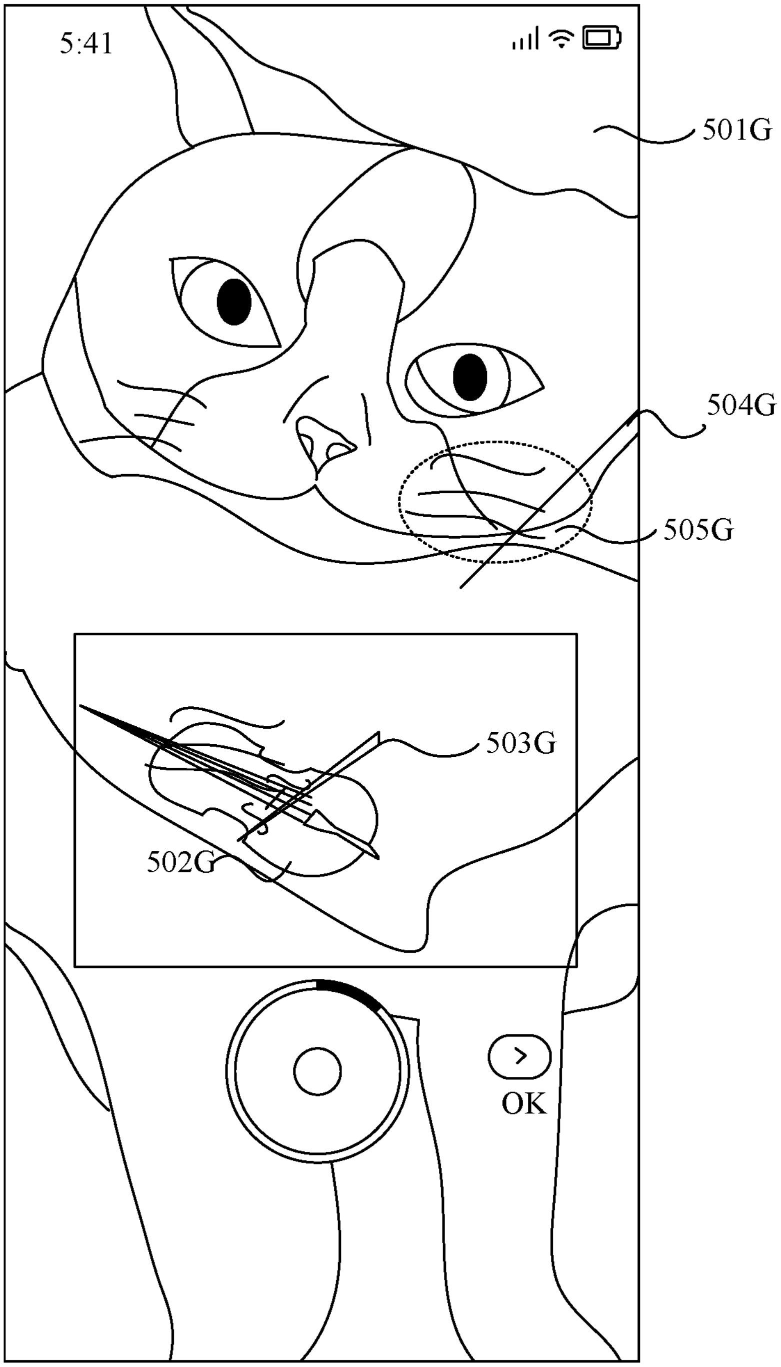

As an example, referring to FIG. 5G, FIG. 5G is a schematic product interface diagram of a virtual-musical-instrument-based audio processing method according to an embodiment of this disclosure. Whiskers 505G and a toothpick 504G are displayed on a human-computer interaction interface 501G. As shown in FIG. 5G, strings 502G of a violin similar in shape to the whiskers 505G are displayed in a region outside an image frame, a contour of the strings 502G of the violin being aligned with that of the whiskers 505G. A bow 503G of the violin similar in shape to the toothpick 504G is displayed in the region outside the image frame, a contour of the bow 503G of the violin being aligned with that of the toothpick 504G. When a relative positional relationship between the whiskers 505G and the toothpick 504G changes, a relative positional relationship between the strings 502G and the bow 503G changes synchronously.

Figure 4B:
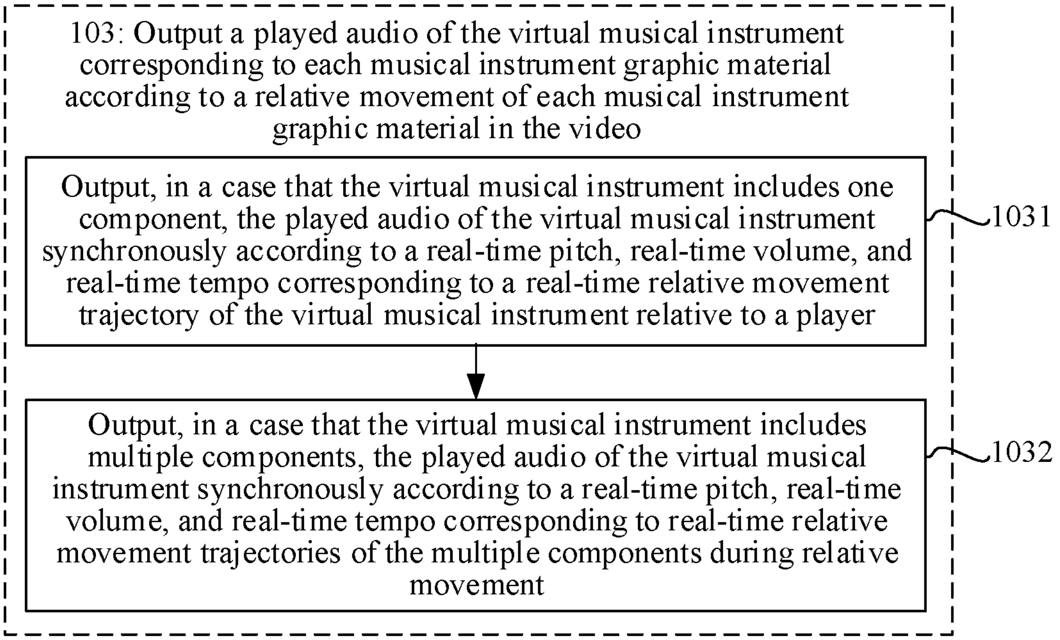

In some embodiments, referring to FIG. 4B, FIG. 4B is a schematic flowchart of a virtual-musical-instrument-based audio processing method according to an embodiment of this disclosure. The operation in step 103 of outputting a played audio of the virtual musical instrument corresponding to each musical instrument graphic material according to a relative movement of each musical instrument graphic material in the video may be implemented by performing steps 1031 to 1032 for each virtual musical instrument.

In step 1031, in a case that the virtual musical instrument includes one component, the played audio of the virtual musical instrument is output synchronously according to a real-time pitch, real-time volume, and real-time tempo corresponding to a real-time relative movement trajectory of the virtual musical instrument relative to a player.

In some embodiments, when the virtual musical instrument includes one component, the virtual musical instrument may be a flute. Descriptions are made with the virtual musical instrument being a flute as an example. The real-time relative movement trajectory of the virtual musical instrument relative to the player may be a movement trajectory of the flute relative to a finger. Regarding the finger of the player as a stationary object, the virtual musical instrument is a moving object. The relative movement trajectory is obtained when the finger of the performer is regarded as a stationary object. The virtual musical instrument at different positions corresponds to different pitches, distances between the virtual musical instrument and the finger correspond to different volumes, and relative movement speeds of the virtual musical instrument relative to the finger correspond to different tempos.

In step 1032, in a case that the virtual musical instrument includes multiple components, the played audio of the virtual musical instrument is output synchronously according to a real-time pitch, real-time volume, and real-time tempo corresponding to real-time relative movement trajectories of the multiple components during relative movement.

In some embodiments, the virtual musical instrument includes a first component and a second component, and the operation in step 1032 of outputting the played audio of the virtual musical instrument synchronously according to real-time relative movement trajectories of the multiple components during relative movement may be implemented by the following technical solution: obtaining a real-time distance between the first component and the second component in a direction perpendicular to a screen, a real-time contact point position of the first component and the second component, and a real-time relative movement speed of the first component and the second component from the real-time relative movement trajectories of the multiple components; determining simulated pressure in negative correlation with the real-time distance, and determining a real-time volume in positive correlation with the simulated pressure; determining a real-time pitch according to the real-time contact point position, the real-time pitch and the real-time contact point position satisfying a set configuration relationship; determining a real-time tempo in positive correlation with the real-time relative movement speed; and outputting a played audio corresponding to the real-time volume, the real-time pitch, and the real-time tempo. The tempo, pitch, and volume of the played audio are controlled based on the real-time relative movement speed, the real-time contact point position, and the real-time distance, so that image-to-sound conversion may be implemented to obtain audio information based on image information, improving the information expression efficiency.

Descriptions will be made below with the first component being a bow and the second component being a string as an example. Simulated pressure of the bow acting on the string is simulated according to a distance between the string and the bow. Then, the simulated pressure is mapped to a real-time volume. A real-time pitch is determined according to a real-time contact point position (bow contact point) of the string and the bow. A movement speed (bow speed) of the bow relative to the string determines a real-time tempo of playing the musical instrument. An audio is outputted based on the real-time tempo, the real-time volume, and the real-time pitch. Therefore, real-time contactless pressing playing is implemented without any wearable device to implement instant pressing playing in no contact with the object.

Figure 6:
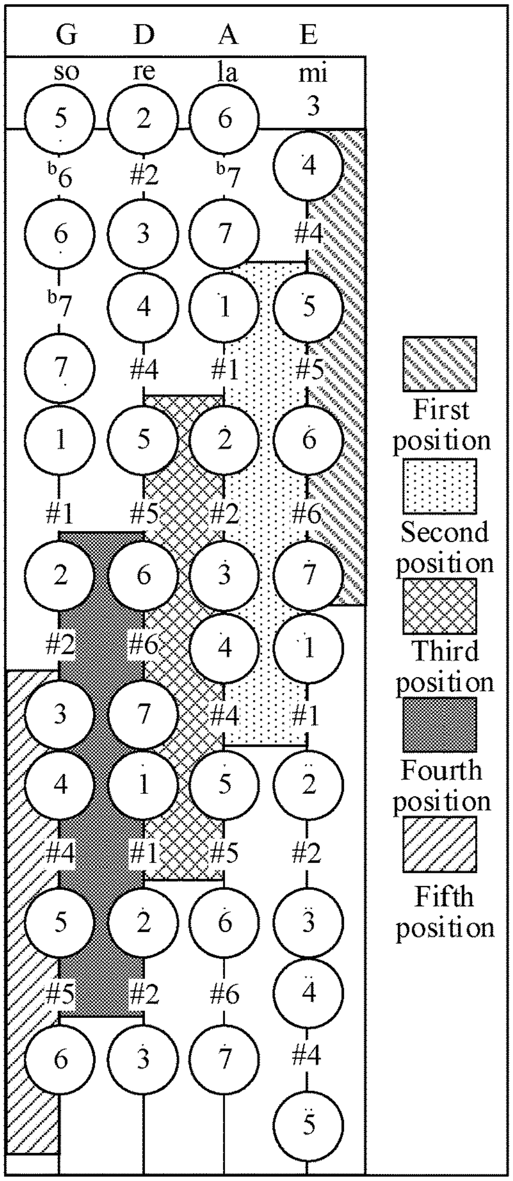
FIG. 6 is a schematic diagram of calculating a real-time pitch according to an embodiment of this disclosure.

As an example, referring to FIG. 6, FIG. 6 is a schematic diagram of calculating a real-time pitch according to an embodiment of this disclosure. There are a first position, a second position, a third position, a fourth position, and a fifth position corresponding to four strings. The four strings correspond to different pitches, and different positions on the strings also correspond to different pitches. Therefore, a corresponding real-time pitch may be determined based on a real-time contact point position of a bow and a string. The real-time contact point position of the bow and the strings is determined in the following manner: projecting the bow onto a screen to obtain a bow projection, projecting the strings onto the screen to obtain string projections, there being four intersection points between the bow projection and the string projections, obtaining actual distances between the bow and the four strings, and determining a position of the intersection point between the string projection corresponding to the closest string and the bow projection on the string projection as the real-time contact point position; or forming a plane by the four strings, projecting the bow onto the plane to obtain a bow projection, then obtaining actual distances between the bow and the four strings, there being four intersection points between the bow projection and the four strings, and determining a position of the intersection point between the closest string and the bow projection on the string as a real-time contact point position.

In some embodiments, the first component is in a different optical ranging layer from a first camera and a second camera, and the second component is in a same optical ranging layer as the first camera and the second camera. The operation of obtaining a real-time distance between the first component and the second component in a direction perpendicular to a screen from the real-time relative movement trajectories of the multiple components may be implemented by the following technical solution: obtaining a first real-time imaging position of the first component on the screen based on the first camera and a second real-time imaging position of the first component on the screen based on the second camera from the real-time relative movement trajectories, the first camera and the second camera being cameras of a same focal length corresponding to the screen; determining a real-time binocular ranging difference according to the first real-time imaging position and the second real-time imaging position; determining a binocular ranging result of the first component and the first camera as well as the second camera, the binocular ranging result being in negative correlation with the real-time binocular ranging difference and in positive correlation with the focal length and an inter-camera distance, and the inter-camera distance being a distance between the first camera and the second camera; and determining the binocular ranging result as the real-time distance between the first component and the second component in the direction perpendicular to the screen. Since the two cameras are in a same optical ranging layer, the first component is in a different optical ranging layer from the two cameras, and the second component is in a same optical ranging layer as the two cameras, the real-time distance between the first component and the second component in the direction perpendicular to the screen may be determined accurately based on a binocular ranging difference between the two cameras. Therefore, the accuracy of the real-time distance may be improved.

Figure 10:
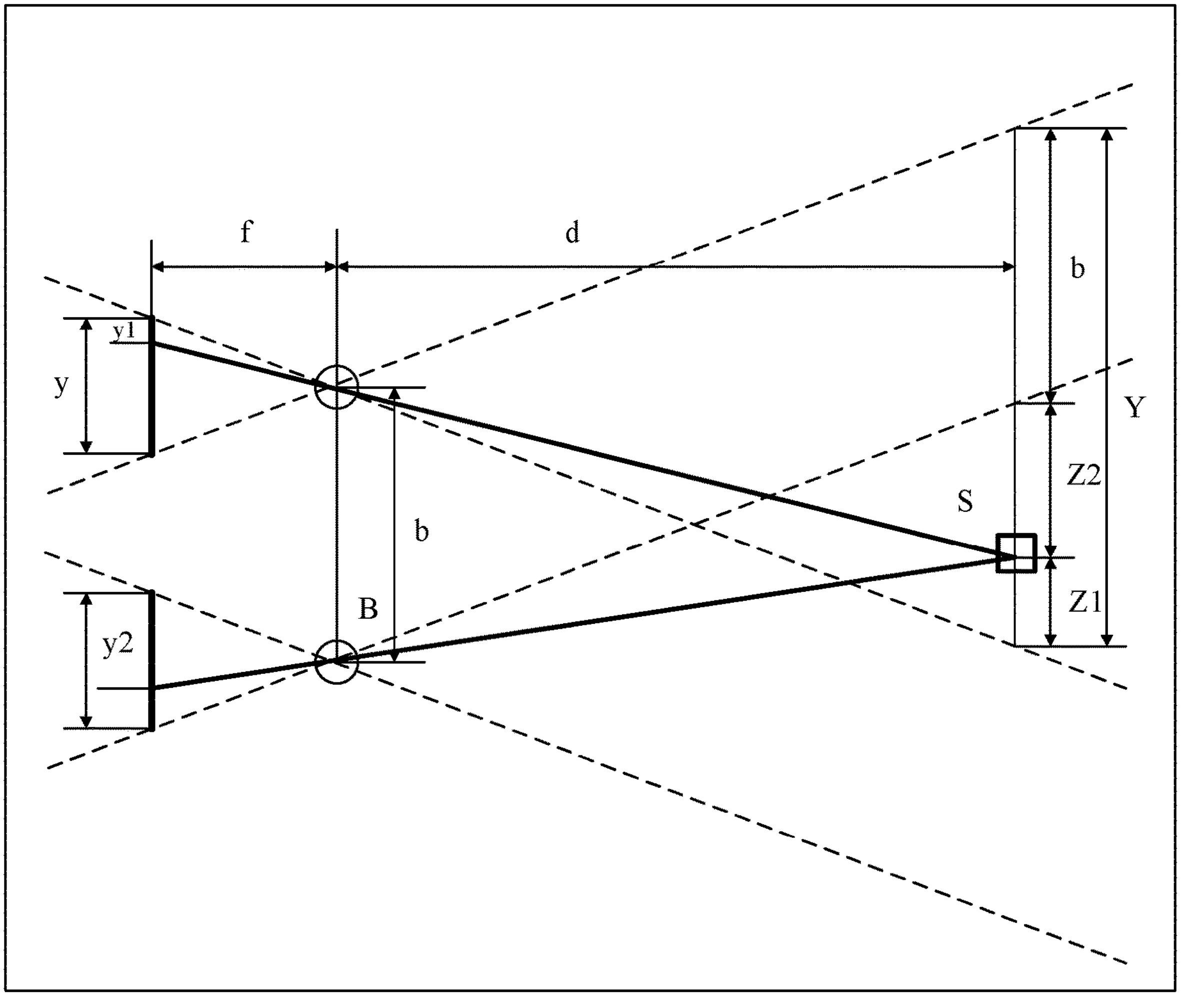
FIG. 10 is a schematic diagram of calculating a real-time distance according to an embodiment of this disclosure.

As an example, the real-time distance is a vertical distance between the bow and a string layer. The string layer is in a same optical ranging layer as the camera, and a vertical distance therebetween is zero. The first component is in a different optical ranging layer from the camera, and the first component may be the bow. Therefore, a distance between the camera and the bow is determined by binocular ranging. Referring to FIG. 10, FIG. 10 is a schematic diagram of calculating a real-time distance according to an embodiment of this disclosure. Formula (1) may be obtained by a similar triangle:

$$\frac{f}{d} = \frac{y}{Y}, \qquad (1)$$

where a distance between the first camera (camera A) and the bow (object S) is a real-time distance d, f represents a distance between the screen and the first camera, i.e., an image distance or a focal length, y represents a length of an image frame after imaging on the screen, and Y represents an opposite side length of the similar triangle.

Then, formulas (2) and (3) may be obtained based on an imaging principle of the second camera (camera B):

$$Y = b + Z2 + Z1; \text{ and} \qquad (2)$$

$$\frac{f}{d} = \frac{y - y2}{Z2} = \frac{y1}{Z1}, \qquad (3)$$

where b represents a distance between the first camera and the second camera, f represents a distance between the screen and the first camera (also a distance between the screen and the second camera), Y represents an opposite side length of the similar triangle, Z2 and Z1 represent segment lengths on the opposite side length, the distance between the first camera and the bow is a real-time distance d, y represents a length of a photo after imaging on the screen, and y1 (first real-time imaging position) and y2 (second real-time imaging position) represent distances between images of the object on the screen and an edge of the screen.

Formula (2) is put into formula (1) to replace Y to obtain formula (4):

$$\frac{f}{d} = \frac{y}{Y} = \frac{y}{b + Z1 + Z2}, \qquad (4)$$

where b represents a distance between the first camera and the second camera, f represents a distance between the screen and the first camera (also a distance between the screen and the second camera), Y represents an opposite side length of the similar triangle, Z2 and Z1 represent segment lengths on the opposite side length, the distance between the first camera and object S is d, and y represents a length of a photo after imaging on the screen.

Finally, formula (4) is transformed to obtain formula (5):

$$d = \frac{fb}{y2 - y1}, \qquad (5)$$

where the distance between the first camera and the bow is a real-time distance d, y1 (a first real-time imaging position) and y2 (a second real-time imaging position) represent distances between images of the bow on the screen and an edge of the screen, and f represents a distance between the screen and the first camera (also a distance between the screen and the second camera).

In some embodiments, before the played audio of the virtual musical instrument is outputted synchronously according to the real-time relative movement trajectories of the multiple components during relative movement, an identifier of an initial volume and an identifier of an initial pitch of the virtual musical instrument are displayed; and playing prompting information is displayed, the playing prompting information being used for giving a prompt of playing the musical instrument graphic material as a component of the virtual musical instrument. The identifiers of the initial volume and the initial pitch are displayed, so that a conversion relationship between an audio parameter (such as the real-time pitch) and an image parameter (such as the contact point position) may be prompted to the user. Therefore, the subsequent audio may be obtained based on the same conversion relationship, improving the audio outputting stability.

Figure 5H:
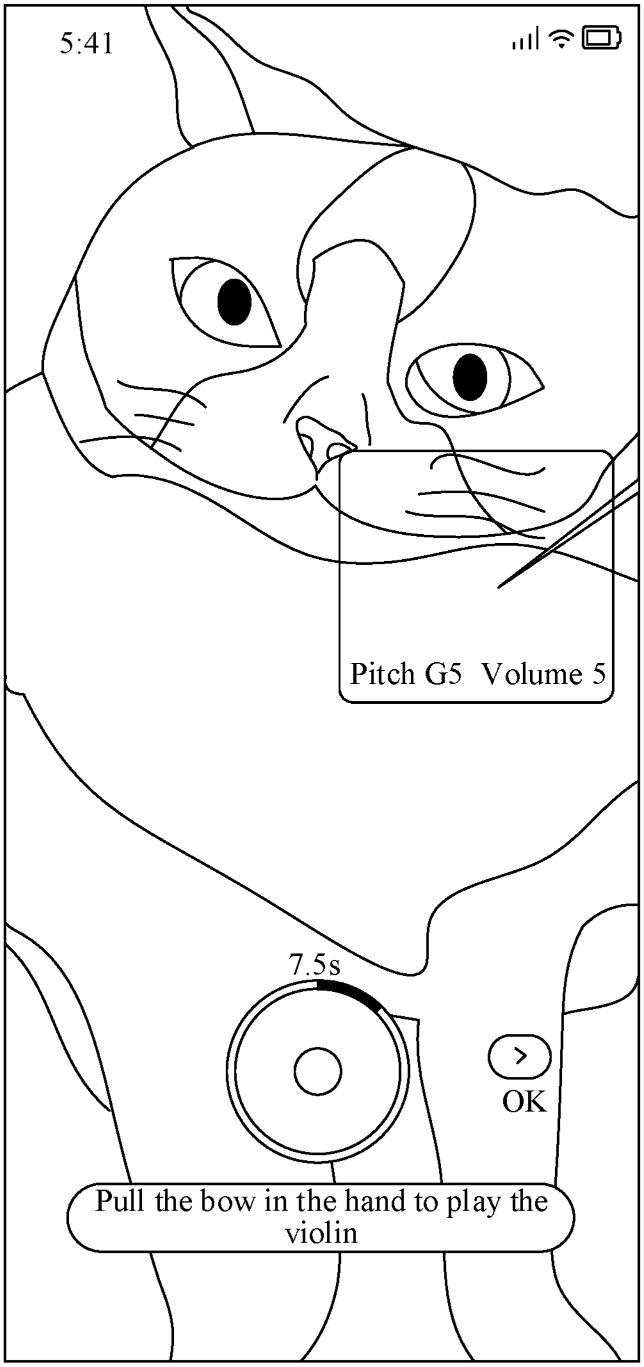

As an example, referring to FIG. 5H, FIG. 5H is a schematic product interface diagram of a virtual-musical-instrument-based audio processing method according to an embodiment of this disclosure. An initial position of the virtual musical instrument is displayed before playing. In FIG. 5H, the initial position represents a relative position of the bow (toothpick) and string (whisker) of the violin. In FIG. 5H, the identifier of the initial volume is 5, the identifier of the initial pitch is G5, and the playing prompting information is "pull the bow in the hand to play the violin". Alternatively, the playing prompting information may have a richer meaning. For example, the playing prompting information is used for prompting the user that the musical instrument graphic material toothpick may be used as the bow of the violin and that the musical instrument graphic material whisker may be used as the string of the violin.

In some embodiments, after the identifier of the initial volume and the identifier of the initial pitch of the virtual musical instrument are displayed, initial positions of the first component and the second component are obtained; a multiple relationship between an initial distance corresponding to the initial positions and the initial volume is determined; and the multiple relationship is applied to at least one of the following relationships: a negative correlation between simulated pressure and a real-time distance, and a positive correlation between the real-time volume and the simulated pressure. The real-time distance is correlated with the real-time volume by the simulated pressure, so that the audio may be outputted with a physical reference, and the audio outputting accuracy may be improved effectively.

Figure 7:
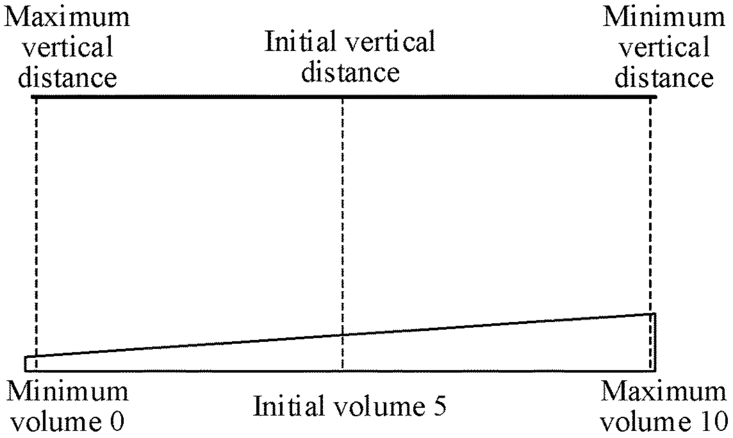
FIG. 7 is a schematic diagram of calculating a real-time volume according to an embodiment of this disclosure.

As an example, referring to FIG. 7, FIG. 7 is a schematic diagram of calculating a real-time volume according to an embodiment of this disclosure. The real-time distance is a vertical distance between the bow and the string in FIG. 7. The initial volume defaults to volume 5, and corresponds to an initial vertical distance. A minimum real-time distance corresponds to maximum volume 10, and a maximum vertical distance corresponds to minimum volume 0. The real-time volume is in negative correlation with the real-time distance, the simulated pressure is in negative correlation with the real-time distance, and the real-time volume is in positive correlation with the simulated pressure. It is necessary to first determine a multiple coefficient of a mapping relationship between the initial vertical distance and the initial volume. If the initial distance is 10 meters, and the initial volume is 5, when the real-time distance is mapped to the real-time volume during subsequent playing, the real-time distance is 5, and the real-time volume is 10. If the initial distance is 100 meters, and the initial volume is 5, when the real-time distance is mapped to the real-time volume during subsequent playing, the real-time distance is 50, and the real-time volume is 10. Therefore, the multiple coefficient may be allocated to the two relationships, or only to any one of the relationships.

In some embodiments, during playing of the video, the following processing is performed for each image frame in the video: performing background picture recognition processing on the image frame to obtain a background style of the image frame; and outputting a background audio correlated with the background style.

As an example, background picture recognition processing may be performed on the image frame to obtain a background style of the image frame. For example, the background style is gray or the background style is bright. A background audio correlated with the background style is outputted. Therefore, the background audio is correlated with the background style of the video, which makes the outputted background audio strongly correlated with a content of the video, and may improve the audio generation quality effectively.

In some embodiments, after playing of the video ends, an audio to be synthesized corresponding to the video is displayed in response to a posting operation performed on the video, the audio to be synthesized including the played audio and a music audio similar to the played audio in a music library; and a selected audio is synthesized with the video in response to an audio selection operation to obtain a synthesized video, the selected audio including at least one of the played audio and the music audio. The played audio is synthesized with the music audio, so that the audio outputting quality may be improved.

As an example, a video posting function may be provided after playing of the video ends. When the video is posted, the played audio may be synthesized with the video for posting, or a music audio similar to the played audio in a music library may be synthesized with the video for posting. After playing of the video ends, an audio to be synthesized corresponding to the video is displayed in response to a posting operation performed on the video. The audio to be synthesized may be displayed in form of a list. The audio to be synthesized includes the played audio and the music audio similar to the played audio in the music library. For example, if the played audio is "For Alice", the music audio is "For Alice" in the music library. In response to an audio selection operation, the selected played audio or music audio is synthesized with the video to obtain a synthesized video, and the synthesized video is posted. Alternatively, the audio to be synthesized may be a synthesized audio of the played audio and the music audio. If there is a background audio during playing, the background audio may also be synthesized with the audio to be synthesized as required to obtain a synthesized audio. The synthesized audio is synthesized with the video as an audio to be synthesized.

In some embodiments, during outputting of the played audio, outputting of the audio is stopped in a case that an audio outputting stopping condition is satisfied, the audio outputting stopping condition including at least one of a pause operation performed on the played audio is received; and a currently displayed image frame of the video includes multiple components of the virtual musical instrument, and a distance between musical instrument graphic materials corresponding to the multiple components exceeds a distance threshold. Stopping audio outputting automatically based on the distance conforms to a real scene of stopping playing, so that a realistic audio outputting effect is achieved. In addition, audio outputting is stopped automatically, so that the video editing efficiency and the utilization rate of audio and video processing resources may be improved.

As an example, a pause operation performed on the played audio may be a shooting stopping operation, or a triggering operation performed on a stop control. A currently displayed image frame of the video includes multiple components of the virtual musical instrument, for example, including a bow and string of a violin, and a distance between a musical instrument graphic material corresponding to the bow and a musical instrument graphic material corresponding to the string exceeds a distance threshold, indicating that the bow and the string are no longer correlated and thus may not be interacted to output any audio.

Figure 4C:
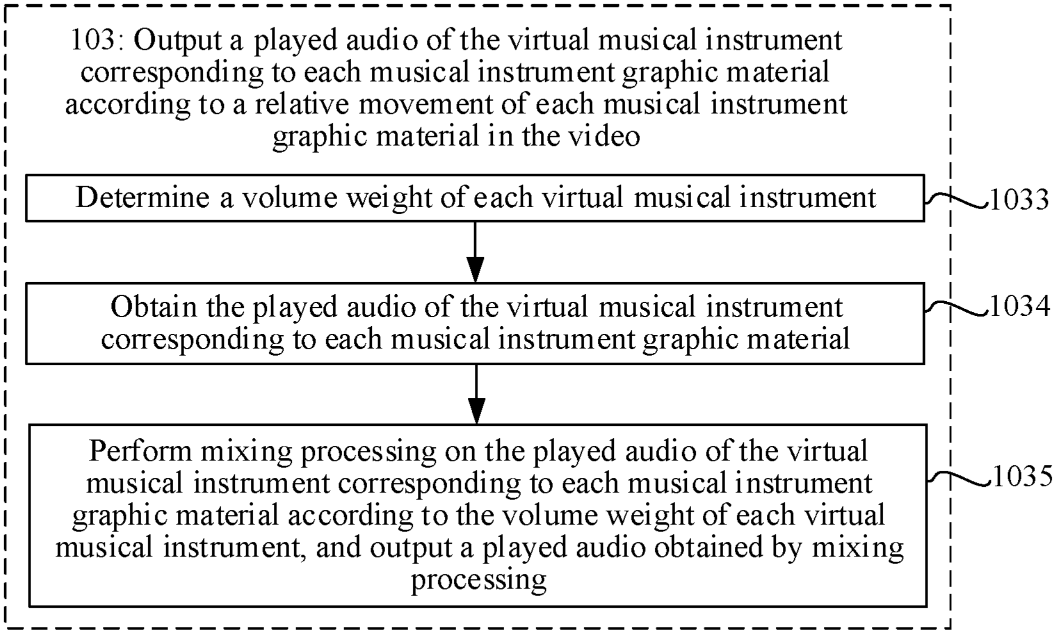

In some embodiments, referring to FIG. 4C, FIG. 4C is a schematic flowchart of a virtual-musical-instrument-based audio processing method according to an embodiment of this disclosure. When a number of the virtual musical instrument is multiple, the operation in step 103 of outputting a played audio of the virtual musical instrument corresponding to each musical instrument graphic material according to a relative movement of each musical instrument graphic material in the video may be implemented by steps 1033 to 1035.

In step 1033, a volume weight of each virtual musical instrument is determined.

As an example, the volume weight is used for representing a volume conversion coefficient of a played audio of each virtual musical instrument.

In some embodiments, the operation in step 1033 of determining a volume weight of each virtual musical instrument in the video may be implemented by the following technical solution: performing the following processing for each virtual musical instrument: obtaining a relative distance between the virtual musical instrument and a picture center of the video; and determining the volume weight of the virtual musical instrument in negative correlation with the relative distance. A collective playing scene may be simulated based on a relative distance between each virtual musical instrument and a picture center of the video, and an audio outputting effect of collective playing may be achieved. Therefore, the audio outputting quality may be improved more effectively.

As an example, taking a symphony as an example, there are in the video multiple musical instrument graphic material that may be recognized as multiple virtual musical instruments. For example, musical instrument graphic materials displayed in the video include musical instrument graphic materials corresponding to a violin, a violoncello, a piano, and a harp, where the violin is closest to the picture center of the video at a minimum relative distance, and the harp is farthest away from the picture center of the video at a maximum relative distance. It is necessary to consider that different virtual musical instruments are of different importance when played audios of different virtual musical instruments are synthesized. The importance of the virtual musical instrument is in negative correlation with the relative distance to the picture center. Therefore, the volume weight of each virtual musical instrument is in negative correlation with the corresponding relative distance.

In some embodiments, when a number of the virtual musical instrument is multiple, the operation in step 1033 of determining a volume weight of each virtual musical instrument in the video may be implemented by the following technical solution: displaying a candidate music style; displaying, in response to a selection operation performed on the candidate music style, a target music style that the selection operation points to; and determining the volume weight corresponding to each virtual musical instrument under the target music style. The volume weight of each virtual musical instrument is determined automatically based on the music style, so that the quality and richness of the audio may be improved, and the outputted played audio may be of a specified music style. Therefore, the audio and video editing efficiency may be improved.

As an example, continuing to take a symphony as an example, there are in the video multiple musical instrument graphic materials that may be recognized as multiple virtual musical instruments. For example, the musical instrument graphic materials displayed in the video include musical instrument graphic materials corresponding to a violin, a violoncello, a piano, and a harp. Taking a music style being a happy music style as an example, since the music style selected by the user or the software is a happy music style, and a configuration file of a volume weight corresponding to each virtual musical instrument under the happy music style is pre-configured, the configuration file may be read to directly determine the volume weight corresponding to each virtual musical instrument under the happy music style, and a played audio of the happy music style may be outputted.

In step 1034, the played audio of the virtual musical instrument corresponding to each musical instrument graphic material is obtained.

In some embodiments, before the operation in step 1034 of obtaining the played audio of the virtual musical instrument corresponding to each musical instrument graphic material or the operation in step 103 of outputting a played audio of the virtual musical instrument corresponding to each musical instrument graphic material, according to a number of the virtual musical instrument and a type of the virtual musical instrument, a music score corresponding to the number and the type is displayed, the music score being used for prompting guided movement trajectories of multiple musical instrument graphic materials; and the guided movement trajectory of each musical instrument graphic material is displayed in response to a selection operation performed on the music score. The guided movement trajectory may help the user with effective human-computer interaction, so as to improve the human-computer interaction efficiency.

As an example, continuing to take a symphony as an example, there are in the video multiple musical instrument graphic materials that may be recognized as multiple virtual musical instruments. For example, the musical instrument graphic materials displayed in the video include musical instrument graphic materials corresponding to a violin, a violoncello, a piano, and a harp. Types of the virtual musical instruments are obtained, such as the violin, the violoncello, the piano, and the harp. Meanwhile, respective numbers of the violin, the violoncello, the piano, and the harp are obtained. Different combinations of virtual musical instruments are suitable for playing different music scores. For example, "For Alice" is suitable to be played by combining the piano and the violin, and "Brahms Concertos" is suitable to be played by combining the violin and the harp. After the music score corresponding to the number and the type is displayed, a guided movement trajectory corresponding to the music score of "Brahms Concertos" is displayed in response to a selection operation of the user or the software pointing to the music score of "Brahms Concertos".

In step 1035, mixing processing is performed on the played audio of the virtual musical instrument corresponding to each musical instrument graphic material according to the volume weight of each virtual musical instrument, and a played audio obtained by mixing processing is output.

As an example, a played audio of a specific pitch, volume, and tempo corresponding to each virtual musical instrument may be obtained according to the relative movement of the musical instrument graphic material corresponding to each virtual musical instrument. Since the volume weight of each virtual musical instrument is different, the volume of the played audio is converted through a volume conversion coefficient represented by the volume weight based on an original volume of the virtual musical instrument. For example, if a volume weight of the violin is 0.1, and a volume weight of the piano is 0.9, a real-time volume of the violin is multiplied by 0.1 for outputting, and a real-time volume of the piano is multiplied by 0.9 for outputting. Different virtual musical instruments output corresponding played audios according to converted volumes, namely a played audio obtained by mixing processing is outputted.

The following describes an exemplary application of this embodiment of this disclosure in an actual application scenario.

In some embodiments, in a real-time shooting scene, in response to a terminal receiving a video shooting operation, a video is shot in real time, and the video shot in real time is played at the same time. Image recognition is performed on each image frame in the video by the terminal or a server. When a cat whisker (instrument graphic material) and toothpick (instrument graphic material) similar in shape to a bow (component of a virtual musical instrument) and string (component of the virtual musical instrument) of a violin are recognized, the bow and string of the violin are displayed in the video played by the terminal. During playing of the video, the musical instrument graphic materials corresponding to the bow and string of the violin present relative movement trajectories. An audio corresponding to the relative movement trajectories is calculated by the terminal or the server. The audio is outputted by the terminal. Alternatively, the played video may be a pre-recorded video.

In some embodiments, a content of the video is recognized by a camera of an electronic device, and the recognized content is matched with a preset virtual musical instrument. A rod-like prop held by a user or a finger is recognized as a bow of a violin, simulated pressure between the bow and a recognized string is determined by binocular ranging of the camera, and a pitch and tempo of an audio generated by the bow and the string are determined based on a real-time relative movement trajectory of the rod-like prop, to implement instant playing in no contact with the object, so as to generate an interesting content based on the played audio.

In some embodiments, a sense of pressure on the bow that is a stressed object is obtained by the camera by ranging, so as to implement a contactless pressing playing. A distance between the string and bow recognized by the camera is first measured by use of a binocular ranging principle. Multiple coefficients of a mapping relationship between a distance and a volume in different scenes are determined according to a recognized initial distance and a given initial volume. In subsequent simulated playing, pressure of the bow acting on the string is simulated according to the distance between the string and the bow. Then, the pressure is mapped to a volume. A pitch of the playing the musical instrument is determined according to a bow contact point of the string and the bow. A bow speed of the bow is captured by the camera, which determines a tempo of the played musical instrument. An audio is outputted based on the tempo, the volume, and the pitch. Therefore, real-time contactless pressing playing is implemented without any wearable device to implement instant pressing playing in no contact with the object.

Figure 5I:
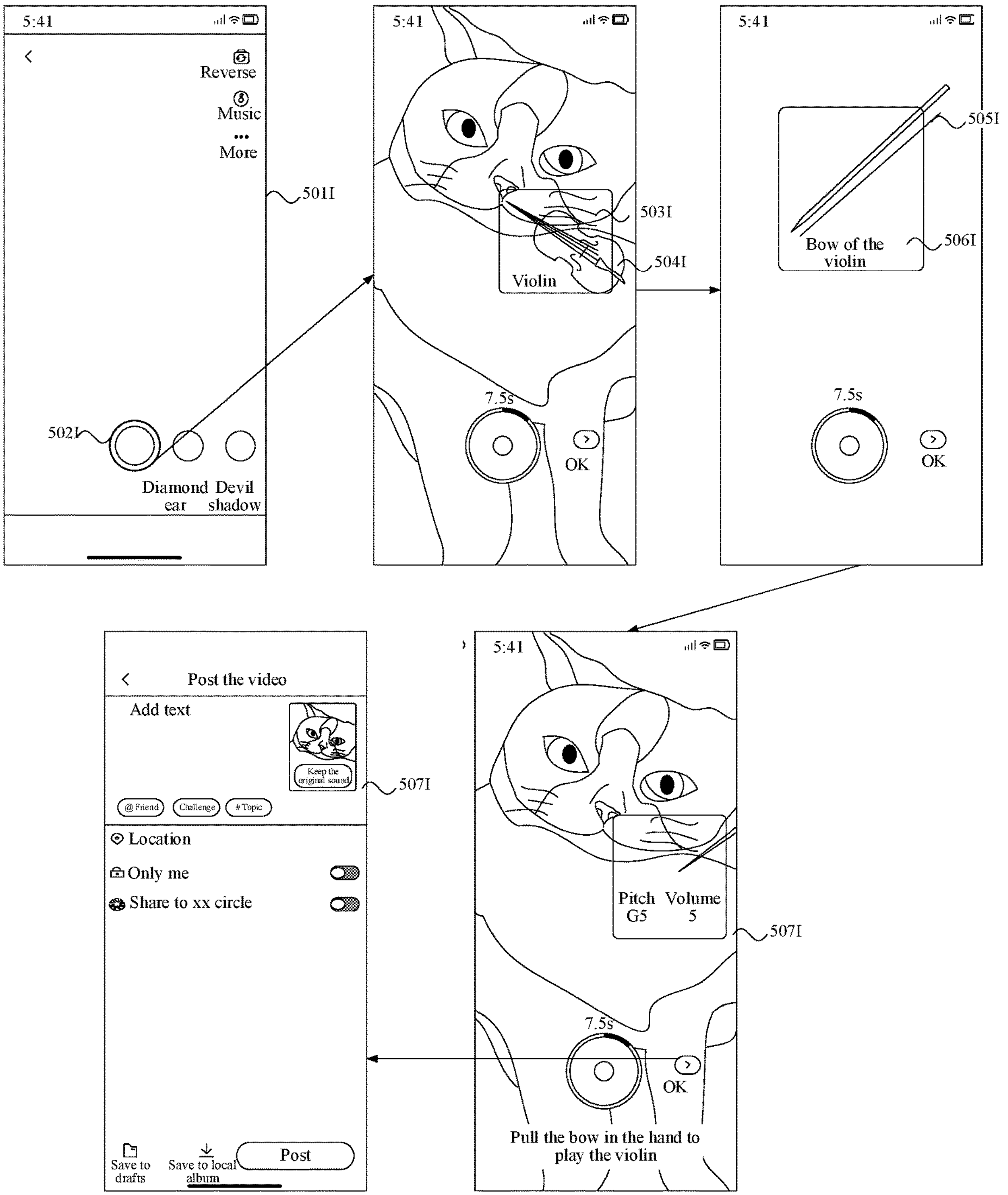

In some embodiments, referring to FIG. 5I, FIG. 5I is a schematic product interface diagram of a virtual-musical-instrument-based audio processing method according to an embodiment of this disclosure. A shooting page 501I of a client is entered in response to an operation of initializing the client. In response to a triggering operation performed on a camera 502I, shooting is started, and a shot content is displayed. A picture is captured and extracted by a camera when the shot content is displayed. A corresponding virtual musical instrument (a back-end server keeps performing recognition until the virtual musical instrument is recognized) is matched according to a musical instrument graphic material (whisker of a cat) 503I. A single-stringed musical instrument is a monochord, a two-stringed musical instrument is an erhu, a three-stringed musical instrument is a trichord, a four-stringed musical instrument is a ukulele, and a five-stringed musical instrument is a banjo. When it is recognized that a component of the virtual musical instrument is a string 504I of a violin, the string 504I of the violin is displayed on the shooting page of the client, there is in a video a rod-like prop 505I held by a user or a finger, and the recognized rod-like prop toothpick 505I is determined as a bow 506I of the violin according to the recognized string of the violin. Alternatively, the whisker of the cat and a rod-like prop toothpick are recognized as the string and a bow respectively. Hereto, recognition and displaying of the virtual musical instrument (which may include multiple components) are completed. The virtual musical instrument may be an independent musical instrument or a musical instrument including multiple components. The virtual musical instrument may be displayed in the video or in a region outside the video. An initial volume is a default volume, such as volume 5. Multiple coefficients corresponding to different scales in different scenes are deduced according to a relationship between an initial volume and an initial distance. The multiple coefficient is a multiple coefficient in a mapping relationship between a volume and a distance. A bow contact point of the bow and the string determines a pitch. An initial volume and initial pitch of the violin are displayed on a screen. For example, the initial pitch is G5, the initial volume is 5, and playing prompting information "pull the bow in the hand to play the violin" is displayed on the screen. A playing process is subsequently displayed on a human-computer interaction interface 508I. Bow pressure of the bow acting on the string is simulated in the playing process according to a real-time distance between the string and the bow, and if the distance is longer, the volume is lower. The pitch is determined in real time according to a position of the bow contact point of the bow on the string. A tempo of playing music is determined according to a bow speed of the bow acting on the string, and if the bow speed is higher, the tempo is higher. Finally, features of a musical composition played by the user, such as the pitch, the volume, and the tempo, are extracted and matched with a music library. A music library audio obtained by fuzzy matching (i.e., a musical composition closest to the composition currently played by the user) may be selected to be synthesized with the video for posting through a posting page 507I. Alternatively, a played audio obtained by playing may be synthesized with the video for posting. Alternatively, a music library audio obtained by fuzzy matching, a played audio, and the video may be combined for posting.

In some embodiments, a suitable background audio is matched during playing according to a background color of the video. The background audio is independent of the played audio. In subsequent synthesis, only the played audio is synthesized with the video, or the background audio, the played audio, and the video are synthesized.

In some embodiments, if multiple candidate virtual musical instruments are recognized, a virtual musical instrument to be displayed is determined in response to a selection operation performed on the multiple candidate virtual musical instruments. If no virtual musical instrument is recognized, a selected virtual musical instrument is displayed for playing in response to a selection operation performed on the candidate virtual musical instruments.

Figure 9:
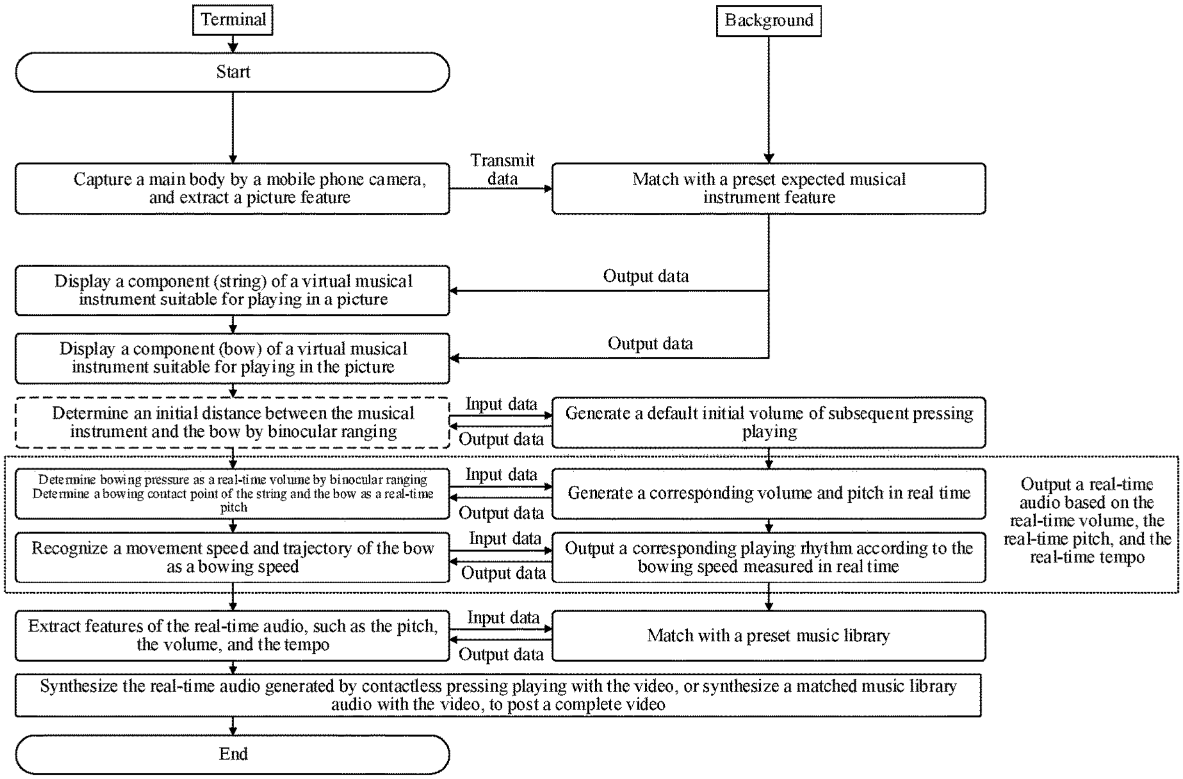
FIG. 9 is a schematic logic diagram of a virtual-musical-instrument-based audio processing method according to an embodiment of this disclosure.

In some embodiments, referring to FIG. 9, FIG. 9 is a schematic logic diagram of a virtual-musical-instrument-based audio processing method according to an embodiment of this disclosure. An execution body includes a terminal operable by a user and a back-end server. First, a main body is captured by a mobile phone camera, and a picture feature is extracted and transmitted to the back-end server. The back-end server matches the picture feature with a preset expected musical instrument feature, and outputs a matching result (a string and a bow). Therefore, the terminal determines and displays a component (the string) of a virtual musical instrument suitable for playing in a picture, determines and displays a component (the bow) of the virtual musical instrument suitable for playing in the picture, determines an initial distance between the bow and the string by a binocular ranging technology, and transmits the initial distance to the back-end server. The back-end server generates an initial volume, and determines a multiple coefficient of a scene scale according to the initial volume and the initial distance. A real-time distance is determined by the binocular ranging technology in a subsequent playing process so as to determine a bow pressure to obtain a real-time volume. Meanwhile, a real-time pitch is determined according to a bow contact point of the string and the bow. A bow speed of the bow is captured by the camera, which determines a real-time tempo of playing the musical instrument. The real-time pitch, the real-time volume, and the real-time tempo are transmitted to the back-end server. The back-end server outputs a real-time audio (played audio) based on the real-time tempo, the real-time volume, and the real-time pitch, and extracts features of the real-time audio so as to match the real-time audio with a music library. A music library audio obtained by fuzzy matching is selected to be synthesized with the video. Alternatively, the real-time audio is synthesized with the video for posting.

In some embodiments, an initial volume is given, an initial distance between the musical instrument and the bow is determined by binocular ranging, a multiple coefficient of a scene scale is deduced in combination with the initial volume and the initial distance, and a distance between the camera and the bow (such as object S in FIG. 10) is determined first by binocular ranging. Referring to FIG. 10, FIG. 10 is a schematic diagram of calculating a real-time distance according to an embodiment of this disclosure. Formula (6) may be obtained by a similar triangle:

$$\frac{f}{d} = \frac{y}{Y}, \tag{6}$$

where a distance between camera A and object S is d, f represents a distance between the screen and camera A, i.e., an image distance or a focal length, y represents a length of a photo after imaging on the screen, and Y represents an opposite side length of the similar triangle.

Then, formulas (7) and (8) may be obtained based on an imaging principle of camera B:

$$Y = b + Z2 + Z1;\ \text{and} \tag{7}$$

$$\frac{f}{d} = \frac{y - y2}{Z2} = \frac{y1}{Z1}, \tag{8}$$

where b represents a distance between camera A and camera B, f represents a distance between the screen and camera A (also a distance between the screen and camera B), Y represents an opposite side length of the similar triangle, Z2 and Z1 represent segment lengths on the opposite side length, the distance between camera A and object S is d, y represents a length of a photo after imaging on the screen, and y1 and y2 represent distances between images of the object on the screen and an edge of the screen.

Formula (6) is put into formula (5) to replace Y to obtain formula (9):

$$\frac{f}{d} = \frac{y}{Y} = \frac{y}{b + Z1 + Z2}, \tag{9}$$

where b represents a distance between camera A and camera B, f represents a distance between the screen and camera A (also a distance between the screen and camera B), Y represents an opposite side length of the similar triangle, Z2 and Z1 represent segment lengths on the opposite side length, the distance between camera A and object S is d, and y represents a length of a photo after imaging on the screen.

Finally, formula (9) is transformed to obtain formula (10):

$$d = \frac{fb}{y2 - y1}, \tag{10}$$

where the distance between camera A and object S is d, y1 and y2 represent distances between images of the object on the screen and an edge of the screen, and f represents a distance between the screen and camera A (also a distance between the screen and camera B).

Figure 8:
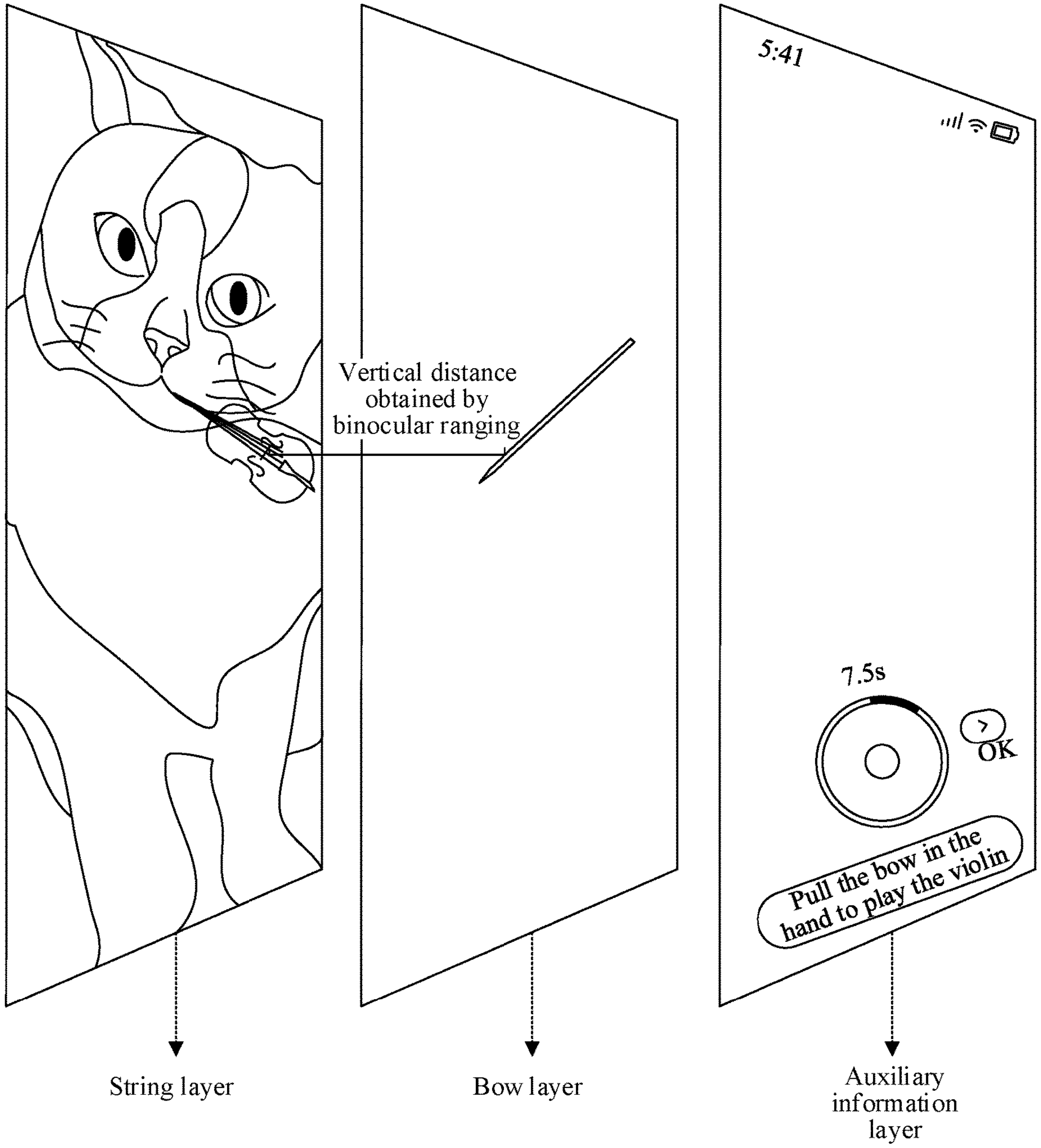
FIG. 8 is a schematic diagram of calculating simulated pressure according to an embodiment of this disclosure.

In some embodiments, referring to FIG. 8, FIG. 8 is a schematic diagram of calculating simulated pressure according to an embodiment of this disclosure. The interface includes three layers, i.e., a recognized string layer, a bow layer of a strip-shaped object held by a user, and an auxiliary information layer respectively. The key is to determine a vertical distance between the bow and the string (i.e., a value of the real-time distance d in FIG. 10) by the camera by binocular ranging. After the mapping relationship between the initial distance and the initial volume is determined, the volume may be adjusted in subsequent interaction by adjusting the distance between the bow and the string. If the distance is longer, the volume is lower, and if the distance is short, the volume is higher. An intersection point of the bow and the string on the screen is determined as a bow contact point. Different positions of the bow contact point determine different pitches. The distance is determined in the subsequent playing process by the binocular ranging technology to further determine bow pressure, so as to determine a corresponding real-time volume. The bow contact point of the string and the bow is mapped as the real-time pitch. Since the multiple coefficient of the scene scale between the initial volume and the initial distance has been determined, the volume is adjusted in subsequent interaction of the user by adjusting the distance between the bow and the string. If the distance is longer, the volume is lower, and if the distance is shorter, the volume is higher. The intersection point of the bow and the string on the screen is determined as the bow contact point, and bow contact points at different positions determine different pitches.

According to the virtual-musical-instrument-based audio processing method provided in the embodiments of this disclosure, a real-time contactless sense of pressure is simulated by real-time physical distance conversion, so that interesting recognition and interaction of objects in a video picture are implemented without any wearable device. Therefore, more interesting contents are generated on the premise of lower cost and fewer limitations.

An exemplary structure of a virtual-musical-instrument-based audio processing apparatus 455 implemented as software modules in the embodiments of this disclosure will then be described. In some embodiments, as shown in FIG. 3, the virtual-musical-instrument-based audio processing apparatus 455 stored in a memory 450 may include the following software modules: a playing module 4551, configured to play a video; a display module 4552, configured to display at least one virtual musical instrument in the video, each virtual musical instrument being matched with a shape of a musical instrument graphic material recognized from the video; and an output module 4553, configured to output a played audio of the virtual musical instrument corresponding to each musical instrument graphic material according to a relative movement of each musical instrument graphic material in the video. One or more modules, submodules, and/or units of the apparatus can be implemented by processing circuitry, software, or a combination thereof, for example.

In some embodiments, the display module 4552 is further configured to perform the following processing for each image frame in the video: display, in an overlaying manner at a position of at least one musical instrument graphic material in the image frame, a virtual musical instrument matched with a shape of the at least one musical instrument graphic material, a contour of the musical instrument graphic material being aligned with that of the virtual musical instrument.

In some embodiments, the display module 4552 is further configured to perform the following processing for each virtual musical instrument in a case that the virtual musical instrument includes multiple components and the video includes multiple musical instrument graphic materials in one-to-one correspondence to the multiple components: display, in the image frame, the multiple components of the virtual musical instrument in the overlaying manner, a contour of each component overlapping that of the corresponding musical instrument graphic material.

In some embodiments, the display module 4552 is further configured to perform the following processing for each image frame in the video: display, in a region outside the image frame in a case that the image frame includes at least one musical instrument graphic material, a virtual musical instrument matched with a shape of the at least one musical instrument graphic material, and display a correlation identifier of the virtual musical instrument and the musical instrument graphic material, the correlation identifier including at least one of a connecting line and a text prompt.

In some embodiments, the display module 4552 is further configured to perform the following processing for each virtual musical instrument: display, in the region outside the image frame, the multiple components of the virtual musical instrument, each component being matched with the shape of the musical instrument graphic material in the image frame, and a positional relationship between the multiple components being consistent with that of the corresponding musical instrument graphic material in the image frame.

In some embodiments, the display module 4552 is further configured to perform the following processing for each virtual musical instrument in a case that the virtual musical instrument includes multiple components and the video includes multiple musical instrument graphic materials in one-to-one correspondence to the multiple components: display, in the region outside the image frame, the multiple components of the virtual musical instrument, each component being matched with the shape of the musical instrument graphic material in the image frame, and a positional relationship between the multiple components being consistent with that of the corresponding musical instrument graphic material in the image frame.

In some embodiments, the display module 4552 is further configured to display images and introduction information of the multiple candidate virtual musical instruments in a case that there are in the video multiple musical instrument graphic materials in one-to-one correspondence to multiple candidate virtual musical instruments, and determine at least one selected candidate virtual musical instrument as a virtual musical instrument to be displayed in the video in response to a selection operation performed on the multiple candidate virtual musical instruments.

In some embodiments, the display module 4552 is further configured to, in a case that there is at least one musical instrument graphic material in the video and each musical instrument graphic material corresponds to multiple candidate virtual musical instruments, before displaying of the at least one virtual musical instrument in the video, perform the following processing for each musical instrument graphic material: display images and introduction information of the multiple candidate virtual musical instruments corresponding to the musical instrument graphic material; and determine at least one selected candidate virtual musical instrument as a virtual musical instrument to be displayed in the video in response to a selection operation performed on the multiple candidate virtual musical instruments.

In some embodiments, the display module 4552 is further configured to, before displaying of the at least one virtual musical instrument in the video, display multiple candidate virtual musical instruments in a case that no musical instrument graphic material corresponding to the virtual musical instrument is recognized from the video, and determine a selected candidate virtual musical instrument as a virtual musical instrument to be displayed in the video in response to a selection operation performed on the multiple candidate virtual musical instruments.

In some embodiments, the output module 4553 is further configured to perform the following processing for each virtual musical instrument: output, in a case that the virtual musical instrument includes one component, the played audio of the virtual musical instrument synchronously according to a real-time pitch, real-time volume, and real-time tempo corresponding to a real-time relative movement trajectory of the virtual musical instrument relative to a player; or output, in a case that the virtual musical instrument includes multiple components, the played audio of the virtual musical instrument synchronously according to a real-time pitch, real-time volume, and real-time tempo corresponding to real-time relative movement trajectories of the multiple components during relative movement.

In some embodiments, the virtual musical instrument includes a first component and a second component. The output module 4553 is further configured to: obtain a real-time distance between the first component and the second component in a direction perpendicular to a screen, a real-time contact point position of the first component and the second component, and a real-time relative movement speed of the first component and the second component from the real-time relative movement trajectories of the multiple components; determine simulated pressure in negative correlation with the real-time distance, and determine a real-time volume in positive correlation with the simulated pressure; determine a real-time pitch according to the real-time contact point position, the real-time pitch and the real-time contact point position satisfying a set configuration relationship; determine a real-time tempo in positive correlation with the real-time relative movement speed; and output a played audio corresponding to the real-time volume, the real-time pitch, and the real-time tempo.

In some embodiments, the first component is in a different optical ranging layer from a first camera and a second camera, and the second component is in a same optical ranging layer as the first camera and the second camera. The output module 4553 is further configured to: obtain a first real-time imaging position of the first component on the screen based on the first camera and a second real-time imaging position of the first component on the screen based on the second camera from the real-time relative movement trajectories, the first camera and the second camera being cameras of a same focal length corresponding to the screen; determine a real-time binocular ranging difference according to the first real-time imaging position and the second real-time imaging position; determine a binocular ranging result of the first component and the first camera as well as the second camera, the binocular ranging result being in negative correlation with the real-time binocular ranging difference and in positive correlation with the focal length and an inter-camera distance, and the inter-camera distance being a distance between the first camera and the second camera; and determine the binocular ranging result as the real-time distance between the first component and the second component in the direction perpendicular to the screen.

In some embodiments, the output module 4553 is further configured to, before the played audio of the virtual musical instrument is outputted synchronously according to the real-time relative movement trajectories of the multiple components during relative movement, display an identifier of an initial volume and an identifier of an initial pitch of the virtual musical instrument, and display playing prompting information, the playing prompting information being used for giving a prompt of playing the musical instrument graphic material as a component of the virtual musical instrument.

In some embodiments, the output module 4553 is further configured to, after the identifier of the initial volume and the identifier of the initial pitch of the virtual musical instrument are displayed, obtain initial positions of the first component and the second component, determine a multiple relationship between an initial distance corresponding to the initial positions and the initial volume, and apply the multiple relationship to at least one of the following relationships: a negative correlation between simulated pressure and a real-time distance, and a positive correlation between the real-time volume and the simulated pressure.

In some embodiments, the apparatus further includes: a posting module 4554, configured to, after playing of the video ends, display an audio to be synthesized corresponding to the video in response to a posting operation performed on the video, the audio to be synthesized including the played audio and a music audio matched with the played audio in a music library, and synthesize a selected audio with the video in response to an audio selection operation to obtain a synthesized video, the selected audio including at least one of the played audio and the music audio.

In some embodiments, during outputting of the played audio, the output module 4553 is further configured to stop outputting of the audio in a case that an audio outputting stopping condition is satisfied, the audio outputting stopping condition including at least one of a pause operation performed on the played audio is received; and a currently displayed image frame of the video includes multiple components of the virtual musical instrument, and a distance between musical instrument graphic materials corresponding to the multiple components exceeds a distance threshold.

In some embodiments, during playing of the video, the output module 4553 is further configured to perform the following processing for each image frame in the video: performing background picture recognition processing on the image frame to obtain a background style of the image frame; and outputting a background audio correlated with the background style.

In some embodiments, the output module 4553 is further configured to: determine a volume weight of each virtual musical instrument, the volume weight being used for representing a volume conversion coefficient of a played audio of each virtual musical instrument; obtain the played audio of the virtual musical instrument corresponding to each musical instrument graphic material; and perform mixing processing on the played audio of the virtual musical instrument corresponding to each musical instrument graphic material according to the volume weight of each virtual musical instrument, and output a played audio obtained by mixing processing.

In some embodiments, the output module 4553 is further configured to perform the following processing for each virtual musical instrument: obtain a relative distance between the virtual musical instrument and a picture center of the video; and determine the volume weight of the virtual musical instrument in negative correlation with the relative distance.

In some embodiments, the output module 4553 is further configured to display a candidate music style, display, in response to a selection operation performed on the candidate music style, a target music style that the selection operation points to, and determine the volume weight corresponding to each virtual musical instrument under the target music style.

In some embodiments, the output module 4553 is further configured to: before outputting of the played audio of the virtual musical instrument corresponding to each musical instrument graphic material, according to a number of the virtual musical instrument and a type of the virtual musical instrument, display a music score corresponding to the number and the type, the music score being used for prompting guided movement trajectories of multiple musical instrument graphic materials; and display the guided movement trajectory of each musical instrument graphic material in response to a selection operation performed on the music score.

According to an aspect of the embodiments of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the virtual-musical-instrument-based audio processing method in the embodiments of this disclosure.

An embodiment of this disclosure provides a computer-readable storage medium (e.g., a non-transitory computer-readable storage medium) storing executable instructions. When the executable instructions are executed by a processor, the processor is caused to perform the virtual-musical-instrument-based audio processing method in the embodiments of this disclosure, for example, the virtual-musical-instrument-based audio processing method shown in FIG. 4A-4C.

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

According to embodiments of this disclosure, a material that may be determined as a virtual musical instrument is recognized from a video, so that the musical instrument graphic material in the video may be endowed with more functions. A relative movement of the musical instrument graphic material in the video is converted into a played audio of the virtual musical instrument for outputting, so that the outputted played audio is strongly correlated with a content of the video. Therefore, not only are audio generation manners enriched, but also the correlation between the audio and the video is strengthened. In addition, the virtual musical instrument is recognized based on the musical instrument graphic material, so that richer picture contents may be displayed under the same shooting resources.

The foregoing descriptions are merely exemplary embodiments of this disclosure and are not intended to limit the scope of this disclosure. Any modification, equivalent replacement, or improvement made without departing from the spirit and range of this disclosure shall fall within the scope of this disclosure.

What is claimed is:

1. A virtual-musical-instrument-based audio processing method, the method comprising:

displaying, on a display, a video based on an original video captured by a first camera;

displaying a first component of a virtual musical instrument in the video when the first component is matched with at least one musical instrument graphic element in the original video;

displaying a second component of the virtual musical instrument in the video based on an object overlapping the at least one musical instrument graphic element in the original video;

determining, by processing circuitry, an initial distance between the first component and the second component along an observation direction of the original video, the initial distance corresponding to an initial volume of the virtual musical instrument;

obtaining a real-time distance between the first component and the second component along the observation direction;

determining, by the processing circuitry, a real-time volume of the virtual musical instrument based on the real-time distance and a mapping relationship, one or more coefficients of the mapping relationship being determined based on the initial distance and the initial volume; and outputting played audio of the virtual musical instrument together with the video based on the real-time volume.

2. The method according to claim 1, wherein the displaying the first component of the virtual musical instrument comprises:

displaying the first component of the virtual musical instrument aligned with the at least one musical instrument graphic element in the video.

3. The method according to claim 1, further comprising:

displaying in the video a correlation identifier of the virtual musical instrument and the at least one musical instrument graphic element.

4. The method according to claim 1, wherein:

a positional relationship between the first component and the second component in the video matches a positional relationship between the at least one musical instrument graphic element and the object in the original video.

5. The method according to claim 1, further comprising:

displaying images and introduction information of a plurality of candidate virtual musical instruments that correspond to the at least one musical instrument graphic element; and determining, based on a selection operation, the virtual musical instrument from the plurality of candidate virtual musical instruments to be displayed in the video.

6. The method according to claim 1, wherein the at least one musical instrument graphic element includes a plurality of musical instrument graphic elements that corresponds to a plurality of candidate virtual musical instruments, and the method further comprises:

displaying images and introduction information of the plurality of candidate virtual musical instruments corresponding to the plurality of musical instrument graphic elements; and determining, in response to a selection operation, the virtual musical instrument from the plurality of candidate virtual musical instruments to be displayed in the video.

7. The method according to claim 1, further comprising:

displaying a plurality of candidate virtual musical instruments when no musical instrument graphic element is recognized in the original video; and determining, based on a selection operation, the virtual musical instrument from the plurality of candidate virtual musical instruments to be displayed in the video.

8. The method according to claim 1, further comprising:

determining the real-time distance between the first component and the second component, a real-time contact point position of the first component and the second component, and a real-time relative movement speed of the first component and the second component from a first real-time relative movement trajectory of the first component and a second real-time relative movement trajectory of the second component;

determining a real-time pitch according to the real-time contact point position; and determining a real-time tempo based on a positive correlation with the real-time relative movement speed, wherein the determining the real-time volume includes:

determining a simulated pressure based on a negative correlation with the real-time distance; and determining the real-time volume based on a positive correlation with the simulated pressure, and the played audio of the virtual musical instrument is outputted based on the real-time volume, the real-time pitch, and the real-time tempo.

9. The method according to claim 1, wherein the obtaining the real-time distance between the first component and the second component comprises:

obtaining a first real-time imaging position of the first component based on the first camera and a second real-time imaging position of the first component based on a second camera, the first camera and the second camera having a same focal length;

determining a real-time binocular ranging difference according to the first real-time imaging position and the second real-time imaging position;

determining a binocular ranging result of the first component based on a negative correlation with the real-time binocular ranging difference and a positive correlation with the focal length and an inter-camera distance, and the inter-camera distance being between the first camera and the second camera; and determining the real-time distance between the first component and the second component based on the binocular ranging result.

10. The method according to claim 1, further comprising:

displaying an identifier of the initial volume and an identifier of an initial pitch of the virtual musical instrument; and displaying playing notification information, the playing notification information indicating an interaction with the at least one musical instrument graphic element corresponding to playing of the first component of the virtual musical instrument.

11. The method according to claim 1, further comprising:

when a position operation is performed, displaying an audio selection interface from which the played audio or music that is determined to match the played audio is selectable as target audio to be synthesized with the video; and synthesizing, based on an audio selection operation via the audio selection interface, the target audio with the video.

12. The method according to claim 1, further comprising stopping the output of the played audio of the virtual musical instrument when:

a pause operation is performed on the played audio; or a distance between the object and the at least one musical instrument graphic element exceeds a distance threshold.

13. The method according to claim 1, further comprising:

during the displaying of the video, performing background picture recognition processing on a plurality of images in the video to obtain a background style of the plurality of images; and outputting background audio correlated with the background style.

14. The method according to claim 1, further comprising:

outputting played audio of a plurality of virtual musical instruments based on volume weights associated with the plurality of virtual musical instruments when the plurality of virtual musical instruments is displayed in the video.

15. The method according to claim 14, further comprising:

for each of the plurality of virtual musical instruments, obtaining a relative distance between the virtual musical instrument and a reference position of the video; and determining the volume weight of the respective virtual musical instrument based on a negative correlation with the relative distance between the virtual musical instrument and the reference position of the video.

16. The method according to claim 14, further comprising:

displaying a candidate music style;

displaying, based on a selection operation performed on the candidate music style, a target music style associated with the selection operation; and determining the volume weights associated with the plurality of virtual musical instruments according to the target music style.

17. The method according to claim 1, further comprising:

displaying a guided movement trajectory of the object or a guided movement trajectory of the at least one musical instrument graphic element corresponding to a music score when a selection operation is performed on the music score.

18. A virtual-musical-instrument-based audio processing apparatus, comprising:

processing circuitry configured to:

display, on a display, a video based on an original video captured by a first camera;

display a first component of a virtual musical instrument in the video when the first component is matched with at least one musical instrument graphic element in the original video;

display a second component of the virtual musical instrument in the video based on an object overlapping the at least one musical instrument graphic element in the original video;

determine an initial distance between the first component and the second component along an observation direction of the original video, the initial distance corresponding to an initial volume of the virtual musical instrument;

obtain a real-time distance between the first component and the second component along the observation direction;

determine a real-time volume of the virtual musical instrument based on the real-time distance and a mapping relationship, one or more coefficients of the mapping relationship being determined based on the initial distance and the initial volume; and output played audio of the virtual musical instrument together with the video based on the real-time volume.

19. The apparatus according to claim 18, wherein the processing circuitry is configured to:

determine the real-time distance between the first component and the second component, a real-time contact point position of the first component and the second component, and a real-time relative movement speed of the first component and the second component from a first real-time relative movement trajectory of the first component and a second real-time relative movement trajectory of the second component;

determine a real-time pitch according to the real-time contact point position;

determine a real-time tempo based on a positive correlation with the real-time relative movement speed;

determine a simulated pressure based on a negative correlation with the real-time distance; and determine the real-time volume based on a positive correlation with the simulated pressure, wherein the played audio of the virtual musical instrument is outputted based on the real-time volume, the real-time pitch, and the real-time tempo.

20. A non-transitory computer-readable storage medium, storing instructions which when executed by a processor cause the processor to perform:

displaying, on a display, a video based on an original video captured by a first camera;

displaying a first component of a virtual musical instrument in the video when the first component is matched with at least one musical instrument graphic element in the video;

displaying a second component of the virtual musical instrument in the video based on an object overlapping the at least one musical instrument graphic element in the original video;

determining an initial distance between the first component and the second component along an observation direction of the original video, the initial distance corresponding to an initial volume of the virtual musical instrument;

obtaining a real-time distance between the first component and the second component along the observation direction;

determining a real-time volume of the virtual musical instrument based on the real-time distance and a mapping relationship, one or more coefficients of the mapping relationship being determined based on the initial distance and the initial volume; and outputting played audio of the virtual musical instrument together with the video based on the real-time volume.

* * * * *